(12) United States Patent
Lim et al.

(10) Patent No.: US 8,331,398 B2
(45) Date of Patent: Dec. 11, 2012

(54) METHOD OF CONSTRUCTING RESOURCE ALLOCATION MAP FOR MOBILE COMMUNICATION SYSTEM

(75) Inventors: Kwang-Jae Lim, Daejeon (KR); Chul-Sik Yoon, Seoul (KR)

(73) Assignees: Samsung Electronics Co., Ltd., Suwon-si (KR); Electronics & Telecommunications Research Institute, Daejeon (KR)

( * ) Notice: Subject to any disclaimer, the term of this patent is extended or adjusted under 35 U.S.C. 154(b) by 1036 days.

(21) Appl. No.: 12/301,972

(22) PCT Filed: May 25, 2007

(86) PCT No.: PCT/KR2007/002552
§ 371 (c)(1),
(2), (4) Date: Nov. 21, 2008

(87) PCT Pub. No.: WO2007/139320
PCT Pub. Date: Dec. 6, 2007

(65) Prior Publication Data
US 2010/0246498 A1 Sep. 30, 2010

(30) Foreign Application Priority Data

May 25, 2006 (KR) .................. 10-2006-0047054
Oct. 2, 2006 (KR) .................. 10-2006-0097021

(51) Int. Cl.
*H04J 3/02* (2006.01)
(52) U.S. Cl. ........................................... 370/462
(58) Field of Classification Search .............. 370/241, 370/252, 310, 328–329, 431, 462, 464; 455/403, 455/422.1, 450–453, 455, 39, 500, 507, 509, 455/512–513, 516–517, 73, 91, 95, 130, 455/179.1
See application file for complete search history.

(56) References Cited

U.S. PATENT DOCUMENTS
6,895,248 B1    5/2005    Akyol et al.
(Continued)

FOREIGN PATENT DOCUMENTS
KR    1020050053312 A    6/2005
(Continued)

OTHER PUBLICATIONS

IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1, Feb. 28, 2006, pp. 1-822, Amendment and Corrigendum to IEEE Std 802. 13-2004, IEEE Computer Society and the IEEE Microwave Theory and Techniques Society, New York, NY 10016-5997, USA.

(Continued)

*Primary Examiner* — Omar Ghowrwal
(74) *Attorney, Agent, or Firm* — Jefferson IP Law, LLP

(57) ABSTRACT

The present invention relates to a method of constructing a resource allocation map in a mobile communication system. In a method of constructing a map in a hierarchial pattern method in a case where a localized resource block (localized RB) and a distributed resource block (distributed RB) need to be simultaneously allocated in regards to a radio resource allocated in a previous frame or reserved with a fixed allocation, a radio resource that is reserved or not used and a radio resource that is newly allocated in a map of a current frame are classified and represented. Then, in regards to a radio resource that is allocated in a current frame, a localized RB and a distributed RB are classified and represented. As for the localized RB, allocation information is represented in an index pattern method, and as for the distributed RB, resource allocation information is represented in a toggle pattern method.

3 Claims, 28 Drawing Sheets

U.S. PATENT DOCUMENTS

2005/0030933 A1* 2/2005 Seyama et al. ............... 370/346
2005/0068884 A1   3/2005 Yoon et al.
2005/0288030 A1   12/2005 Choi et al.
2008/0240022 A1   10/2008 Yoon et al.
2009/0059860 A1* 3/2009 Maltsev et al. ............... 370/330

FOREIGN PATENT DOCUMENTS

WO    20050008360 A2    1/2005

OTHER PUBLICATIONS

Nokia, Resource Block Allocation—Mapping Rules, Feb. 2006, Agenda item 13.1.3, Document for Decision, 3G TSG RAN WG1 #44, R1-060286, Meeting, Denver, USA.

* cited by examiner

FIG. 17

Mother MAP

| Fields | Description |
|---|---|
| Fixed fields | Fixed Fields |
| New RB bit pattern | Bit Pattern For Discriminating New RBs |
| Localized RB bit pattern | Bit Pattern For Discriminating Localized RBs |
| Child MAP flag | Flag Bit Informing Usage Of Child Map |
| If (Child MAP flag=1) { | Case Where Child Map Is Used |
| For (i=0; i<Nc; i++) { | Nc: The Number Of Child Maps |
| Child MAP TF | Modulation And Coding Scheme Of Child Map |
| Child MAP size | Resource Occupying Size Of Child Map |
| } | |
| } | |
| Else { | Case Where Child Map Is Not Used |
| Number of localized bursts (Nb) | The Number Of Localized Allocations |
| For (i=0; i<Nb; i++) { | Nb: The Number Of Localized Allocations |
| MAC ID | Transmission Method Information |
| Type | Information Related To HARQ |
| HARQ | Resource Occupying Time |
| Duration | Modulation And Coding Scheme |
| TF | |
| } | |
| If (Nb >0) { | |
| If (Nb>1) { | |
| index pattern | Index Pattern For Allocation For Each Terminal |
| } | |
| } | |
| Number of distributed bursts (Nd) | The Number Of Distributed AllocationsM |
| For (i=0; i<Nd; i++) { | |
| MAC ID | User / Group ID |
| Type | Transmission Method Information |
| HARQ | Information Related To HARQ |
| Duration | Resource Occupying Time |
| TF | Modulation And Coding Scheme |
| } | |
| If (Nd >0) { | |
| toggle pattern | Toggle Pattern For Allocation For Each Terminal |
| } | |
| } | |
| CRC | CRC Bit |

FIG. 18

Mother MAP

| Fields | Description |
|---|---|
| Fixed fields | Fixed Fields |
| New RB bit pattern | Bit Pattern For Discriminating New RBs |
| Localized RB bit pattern | Bit Pattern For Discriminating Localized RBs |
| Number of localized bursts (Nb) | The Number Of Localized Allocations |
| For (i=0; i<Nb; i++) { | Nb: The Number Of Localized Allocations |
|    MAC ID | User / Group ID |
|    Type | Transmission Method Information |
|    HARQ | Information Related To HARQ |
|    Duration | Resource Occupying Time |
|    TF | Modulation And Coding Scheme |
| } | |
| If (Nb >0) { | |
|    If (Nb>1) { | |
|      index pattern | Toggle Pattern For Allocation For Each Terminal |
|    } | |
| } | |
| Number of distributed bursts (Nd) | The Number Of Distributed Allocations |
| For (i=0; i<Nd; i++) { | |
|    MAC ID | User / Group ID |
|    Type | Transmission Method Information |
|    HARQ | Information Related To HARQ |
|    Duration | Resource Occupying Time |
|    TF | Modulation And Coding Scheme |
| } | |
| If (Nd >0) { | |
|    toggle pattern | Toggle Pattern For Allocation For Each Terminal |
| } | |
| CRC | CRC Bit |

FIG. 19

Mother MAP

| Fields | Description |
|---|---|
| Fixed fields | Fixed Fields |
| New RB bit pattern | Bit Pattern For Discriminating New RBs |
| Localized RB bit pattern | Bit Pattern For Discriminating Localized RBs |
| For (i=0; i<Nc; i++) { | Nc: The Number Of Child Maps |
|    Child MAP TF | Modulation And Coding Scheme Of Child Map |
|    Child MAP size | Resource Occupying Size Of Child Map |
| } | |
| CRC | CRC Bit |

FIG. 21

Child MAP

| Fields | Description |
|---|---|
| Number of localized bursts (Nb) | The Number Of Localized Allocations |
| For (i=0; i<Nb; i++) { | Nb: The Number Of Localized Allocations |
|    MAC ID | User / Group ID |
|    Type | Transmission Method Information |
|    HARQ | Information Related To HARQ |
|    Duration | Resource Occupying Time |
|    TF | Modulation And Coding Scheme |
| } | |
| If (Nb >0) { | |
|    If (Nb>1) { | |
|      Child index pattern | Index Pattern For Allocation For Each Terminal |
|    } | |
| } | |
| Number of distributed bursts (Nd) | The Number Of Distributed Allocations |
| For (i=0; i<Nd; i++) { | |
|    MAC ID | User / Group ID |
|    Type | Transmission Method Information |
|    HARQ | Information Related To HARQ |
|    Duration | Resource Occupying Time |
|    TF | Modulation And Coding Scheme |
| } | |
| If (Nd >0) { | |
|    Child toggle pattern | Toggle Pattern For Allocation For Each Terminal |
| } | |
| CRC | CRC Bit |

FIG. 23
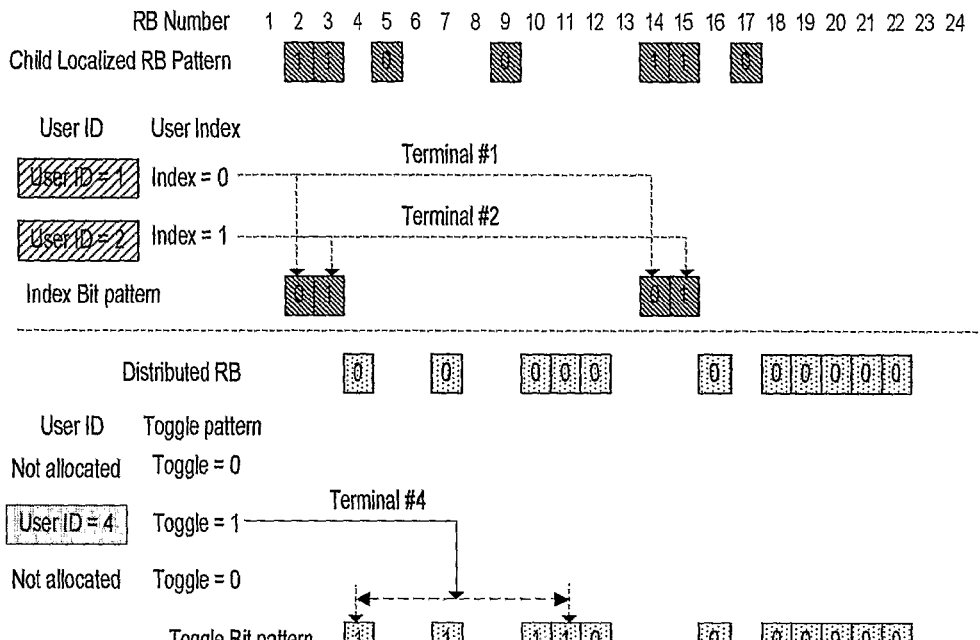
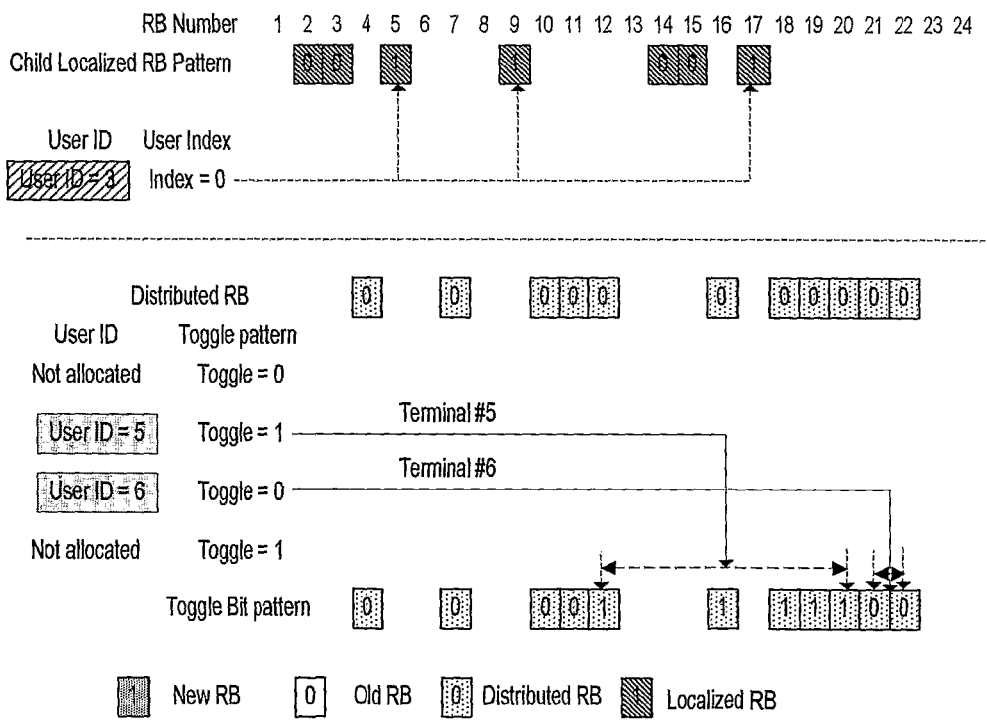

FIG. 26

Child MAP

| Fields | Description |
|---|---|
| Number of localized bursts (Nb) | The Number Of Localized Allocations |
| For (i=0; i<Nb; i++) { | |
|    MAC ID | User / Group ID |
|    Type | Transmission Method Information |
|    HARQ | Information Related To HARQ |
|    Duration | Resource Occupying Time |
|    TF | Modulation And Coding Scheme |
| } | |
| If (Nb >0) { | |
|    Child localized RB pattern | Bit Pattern For Discriminating Child Localized RBs |
|    If (Nb>1) { | |
|       Child index pattern | Index Pattern For Allocation For Each Terminal |
|    } | |
| } | |
| Number of distributed bursts (Nd) | The Number Of Distributed Allocations |
| For (i=0; i<Nd; i++) { | |
|    MAC ID | User / Group ID |
|    Type | Transmission Method Information |
|    HARQ | Information Related To HARQ |
|    Duration | Resource Occupying Time |
|    TF | Modulation And Coding Scheme |
| } | |
| If (Nd >0) { | |
|    Child DRB start | Starting Point For Discriminating Child Distributed RBs |
|    Child DRB length | Length For Discriminating Child Distributed RBs |
|    If (Nd>1) { | |
|       Child toggle pattern | Toggle Pattern For Allocation For Each Terminal |
|    } | |
| } | |
| CRC | CRC Bit |

FIG. 27
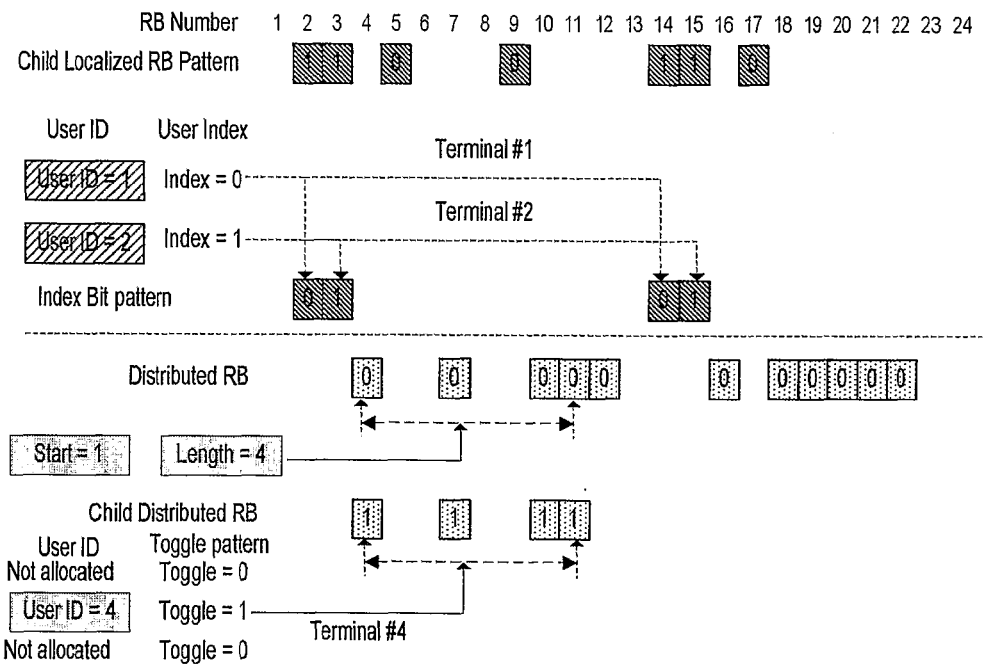
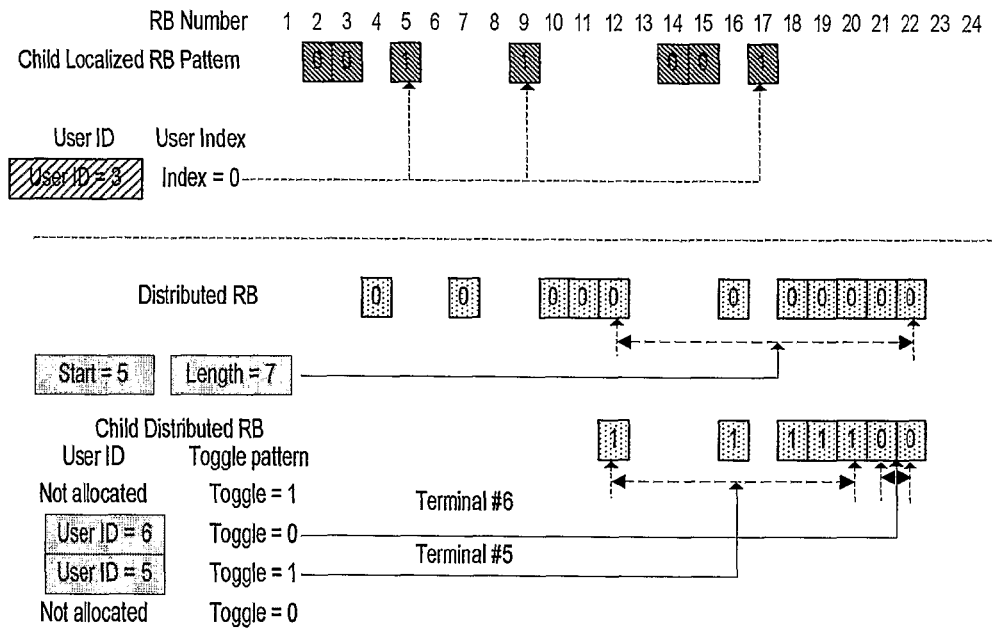

METHOD OF CONSTRUCTING RESOURCE ALLOCATION MAP FOR MOBILE COMMUNICATION SYSTEM

BACKGROUND OF THE INVENTION (a) Field of the Invention

The present invention relates to a method of constructing a resource allocation map for a mobile communication system. More particularly, the present invention relates to a method of constructing a resource allocation map for an OFDMA mobile communication system in a case where a localized resource block (localized RB) and a distributed resource block (distributed RB) need to be simultaneously allocated in regards to a radio resource allocated in a previous frame or reserved with a fixed allocation.

(b) Description of the Related Art

An orthogonal frequency division multiplexing (hereinafter, referred to as "OFDM") method is a method in which after high-speed serial signals are separated into low-speed parallel signals, the low-speed parallel signals are modulated with an orthogonal sub-carrier, and the modulated low-speed parallel signals are transmitted and received. Further, a transmission terminal maintains orthogonality between carriers by using a simple method, such as guard interval insertion. As a result, a complicated equalizer or a rake receiver in a DS_CDMA (direct sequence-code division multiple access) method becomes unnecessary in a reception terminal.

Since an orthogonal frequency division multiple access (hereinafter, referred to as "OFDMA") method has excellent characteristics, the OFDMA method has been adopted as a standard modulation method in digital broadcasting, a wireless LAN such as IEEE 802.11a or HIPERLAN, and a fixed broadband wireless access such as IEEE 802.16. The OFDMA method has been examined as one of applicable technologies of a modulation and demodulation/multiple access method even in a UMTS (universal mobile telecommunications system).

Currently, various OFDM-based multiple access methods are actively being researched. Among them, the OFDMA method has been examined and researched as a candidate technology for achieving next generation mobile communication in which a user request for high-speed multimedia services or the like is rapidly increasing. The OFDMA method is a two-dimensional access method that couples a time division access technology and a frequency division access technology.

FIG. 1 is a diagram illustrating a structure of a data frame in an OFDM/OFDMA wireless communication system according to the prior art.

In FIG. 1, the horizontal axis indicates a time axis that is displayed in a unit of a symbol, and a vertical axis indicates a frequency axis that is displayed in a unit of a sub-channel. The sub-channel means collection of a plurality of sub-carriers. Specifically, in an OFDMA physical layer, active sub-carriers are divided into groups, and each sub-carrier group is transmitted to a different reception terminal. A sub-carrier group that is transmitted to one reception terminal is referred to as a sub-channel. The sub-carriers that form each sub-channel may be adjacent to one another or spaced apart from one another at equivalent intervals. At this time, a distributed sub-channel that is composed of distributed sub-carriers is referred to as a distributed resource block (hereinafter referred to as "distributed RB"), and a localized sub-channel that is composed of neighboring sub-carriers is referred to as a localized resource block (hereinafter referred to as "localized RB"). That is, when sub-carriers that belong to a resource block (hereinafter referred to as "RB") are distributed on a frequency axis, the corresponding RB is referred to as a distributed RB, and when the sub-carriers are adjacent to one another, the corresponding RB is referred to as a localized RB.

In this case, the RB is a minimal radio resource unit that divides a radio resource used when transmitting downlink data and uplink data, and each RB is composed of a plurality of sub-carriers on a frequency axis and one or more symbols on a time axis.

Generally, due to multipath fading, in a movement radio channel, a specific band has a high channel gain on a frequency axis, while another band has a low channel gain. That is, the movement radio channel has a frequency selective fading characteristic. When a user walks to move, that is, when a movement speed of a terminal is low, since a channel gain slowly varies in each band, the terminal selects a specific band that has a relatively large channel gain and informs a base station of the selected band, and the base station is allowed to transmit data in a transmission method where a data rate is high in the corresponding specific band, thereby obtaining a frequency selective scheduling gain. In this case, it is required that a radio resource belonging to the band selected by the terminal is not distributed on a frequency axis but exists in the corresponding band. For this reason, the base station allocates the radio resource to the corresponding terminal by using the localized RB.

When a mobile terminal moves at a high speed and thus a channel quickly varies or there is no information for the band selected by the mobile terminal, frequency selective scheduling cannot be used. In this case, in order to obtain frequency diversity, the base station allocates the distributed RB composed of sub-carriers distributed from the side of the frequency to a mobile terminal.

The base station uses a map to inform each mobile terminal of information for the radio resource allocated in the above-described manner. That is, in order to inform each mobile terminal of the information for the radio resource allocated to each mobile terminal, the base station constructs the map including information for an ID corresponding to a mobile terminal to which the radio resource is allocated, a location of the allocated radio resource, and a transmission method to be used in the allocated radio resource.

Meanwhile, in order to effectively transmit the map, the map may be transmitted in a state where a different modulation and coding scheme is applied to the map. In this case, radio resource allocation information is transmitted through sub-maps having different modulation and coding schemes. A main map includes information for the location of the radio resource used when transmitting each sub-map and information for the used modulation and coding scheme, and each sub-map includes radio resource allocation information for the mobile terminal. Hereinafter, the main map is referred to as a mother map, and the sub-map is referred to as a child map. As for the radio resource used for transmitting the map, a radio resource is notified through a broadcasting channel, or a generally known fixed radio resource is allocated. Accordingly, a method of allocating a radio resource for transmitting the map is not described below.

FIG. 2 shows a method of allocating a radio resource composed of twenty-four localized RBs to three mobile terminals. According to this method, the base station informs each terminal of radio resource allocation information by using a bit-map method.

Generally, a frequency bandwidth that has a high channel gain with respect to each mobile terminal according to a frequency selective channel characteristic of each mobile terminal may be focused on an arbitrary portion in an entire band or distributed partially in the entire band. In this case, since the distributed frequency band may be selected and used, a bit-map that can inform the locations of allocated RBs is used.

As shown in FIG. 2, when the bit-map method is used, the number of bits needed when transmitting information of a radio resource allocated to each terminal is needed by the number of RBs in the entire radio resource, for example, 24 bits when the entire radio resource is composed of twenty-four RBs.

Further, in order to represent an RB that is allocated to a corresponding terminal, a corresponding bit is set to 1, and in order to represent a RB that is not allocated to the corresponding terminal, a corresponding bit is set to 0. For example, when RBs allocated to a terminal #1 are 2 and 14, the second and fourteenth bits become 1, and the other bits become 0. Further, when RBs allocated to a terminal #2 are 3 and 15, the third and fifteenth bits in the bit map allocated to a terminal #2 are set to 1, and the other bits are set to 0. At this time, the order of bit columns of the bit map allocated to individual terminals is the same as the order of RBs. That is, the bit that represents the first RB becomes the first bit of the bit column.

When a radio resource is composed of $N_{RB}$ localized RBs, Equation 1 represents the number of bits needed for allocation information included in the map in order to allocate the radio resource to M mobile terminals in the bit-map method.

$$X_{BitMap}=M(L_{ID}+N_{RB}+L_{TX})=M(L_{ID}+L_{TX})+M(N_{RB}) \quad \text{(Equation 1)}$$

In this case, reference character $X_{BITMAP}$ indicates the number of bits needed for allocation information, reference character M indicates the number of mobile terminals allocated, reference character $L_{ID}$ indicates bit lengths of IDs for discriminating mobile terminals, reference character $N_{RB}$ indicates the number of RBs, and reference character $L_{TX}$ indicates a bit length of a field to inform a transmission method.

As represented in Equation 1 described above, in order to represent the resource allocation information, in each mobile terminal, bits corresponding to the total number of RBs, bits for representing an ID of a mobile terminal, and bits for representing a transmission method are necessary. Therefore, as described above, the resource allocation method that uses the bit-map needs a large amount of bits.

FIG. 3 shows a method of allocating a radio resource composed of twenty-four distributed RBs to three mobile terminals. In this case, a base station informs each terminal of radio resource allocation information by using a run-length method.

When a frequency is not selectively used in a specific band, the radio resource can be sequentially allocated to each terminal by using the distributed RBs in a run-length method. In the run-length method, by using a size of the radio resource, the location of the radio resource allocated to each mobile terminal can be informed.

As shown in FIG. 3, in the case where the first to fourth RBs are allocated to the mobile terminal #1, if the terminal #1 recognizes that the terminal #1 is first allocated with the radio resource, that is, four RBs, the terminal #1 can know the location of the radio resource that is allocated to the terminal #1. Further, in the case of the terminal #2, if the terminal #2 knows that the number of RBs allocated to the terminal #2 is five and the four RBs are allocated to the terminal #1, the terminal #2 can know that the radio resource allocated to the terminal #2 corresponds to five RBs from 5 to 9. In the same manner, in the case of the terminal #3, if the terminal #3 can know the number of RBs allocated to the terminal #3 and the number of accumulated RBs of the radio resource allocated to the first and second terminals allocated with the radio resource prior to the terminal #3, the terminal #3 can know a starting point and an ending point of the radio resource that is allocated to the terminal #3.

As described above, when allocating a continuous radio resource, such as distributed RBs, to each mobile terminal in the run-length method, only the length of a radio resource allocated to each terminal is informed, and thus each terminal can know the location of the radio resource that is allocated to each terminal. Equation 2 represents the number of bits needed when informing each mobile terminal of radio resource allocation information in the case where the run-length method is used.

$$X_{Runlength}=X_{BitMap}=M(L_{ID}+\lceil \log_2 N_{RB}\rceil+L_{TX}) \quad \text{(Equation 2)}$$

In this case, $\lceil X \rceil$ indicates a minimal positive number that is equal to or larger than X, reference character $X_{Runlength}$ indicates the number of bits needed for allocation information, reference character M indicates the number of mobile terminals allocated, reference character $L_{ID}$ indicates bit lengths of IDs for discriminating mobile terminals, reference character $N_{RB}$ indicates the number of RBs, and reference character $L_{TX}$ indicates a bit length of a field to inform a transmission method.

In the above-described run-length method, each mobile terminal needs to accurately know a size of the radio resource allocated to all of the mobile terminals allocated with the radio resource prior to each mobile terminal so as to calculate the location of the radio resource allocated to each terminal. However, in a mobile radio channel environment, all signals are not completely received. For this reason, when a previously allocated resource allocation message is not received or an error occurs at the time of receiving the resource allocation message, each terminal may mis-recognize the location of the radio resource allocated to each terminal. Accordingly, each mobile terminal does not receive a packet transmitted to each terminal through a downlink, and transmits a packet to an erroneous uplink wireless band.

Further, in the run-length method, when in a previous frame, a radio resource is allocated to a specific mobile terminal for a period of one frame or more or a specific RB is allocated in a fixed allocation method to be used until a message indicating stopping use of the specific RB is transmitted, each mobile terminal that confirms information for a radio resource allocated to each mobile terminal in a map of a current frame needs to accurately know all RBs that are allocated in the previous frame as well as a current frame and are valid until the current frame. However, when not accurately receiving the map of the previous frame, the previous allocated RBs cannot be discriminated by using the run-length information included in the map of the current frame, which does not accurately know the locations of the RBs allocated in the current frame.

Further, when the localized RB and the distributed RB are simultaneously allocated, in the run-length method, each mobile terminal needs to accurately know not only the distributed RBs allocated to the other mobile terminals but also the locations of the localized RBs so as to know the locations of the RBs allocated to each mobile terminal. Furthermore, when using a plurality of sub-maps using different modulation and coding schemes in order to transmit allocation information, each mobile terminal needs to accurately receive not only a sub-map including allocation information corresponding to each mobile terminal but also other sub-maps including allocation information corresponding to the other terminals. However, in the case where an error occurs when each mobile terminal receives other sub-maps, each mobile terminal cannot accurately know the location of the radio resource that is allocated to each mobile terminal.

Accordingly, even in the case where the distributed RBs are allocated, in order to accurately inform the location of the radio resource that is allocated to each mobile terminal, each terminal needs to know a radio resource allocated to each mobile terminal by using a bit-map method or a start-length method regardless of allocations for the other mobile terminals.

FIG. 4 shows the resource allocation using the bit-map method in the case where the localized RB and the distributed RB are simultaneously allocated and a specific RB is used in a state where the specific PB is reserved until a current frame from a previous frame.

As shown in FIG. 4, the first, sixth, eighth, and thirteenth RBs are reserved in the previous frame, and the second, third, fifth, ninth, fourteenth, fifteenth, and seventeenth RBs indicate the localized RBs. Meanwhile, except for the reserved RBs and the RBs allocated as the localized RBs, the other RBs are allocated and used as the distributed RBs.

As shown in FIG. 4, due to using the previously reserved RBs and the localized RBs, the allocations of the distributed RBs are not continuously made but are distributed. Therefore, the bit-map method is used with respect to the distributed RBs. As such, when the allocation information is represented in the bit-map method for the distributed RBs, bit columns each having a length corresponding to the number of RBs in the entire radio resource are needed by the number of mobile terminals, and thus the size of the map for representing the allocation information is increased.

FIG. 5 shows a case where a bit-map method is used for localized RBs and a start-length method is used for distributed RBs in the allocation of the radio resource having the same RB structure as FIG. 4. The start-length method is a method in which a starting location of the radio resource allocated to each terminal and the number of allocated RBs are included in the map.

As shown in FIG. 5, when constructing radio resource allocation information, the number of bits required is decreased, as compared with the bit-map method shown in FIG. 4. However, in regards to the RBs to be not continuous but distributed, the RBs need to be informed of the independent start-length. Therefore, the number of start lengths is needed by the number of distributed RBs, and thus the size of the map is increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of constructing a resource allocation map for a mobile communication system, having advantages of informing corresponding radio resource allocation information to each mobile terminal regardless of whether a map in a previous frame or a map in a current frame is received, in a case where a localized resource block (localized RB) and a distributed resource block (distributed RB) need to be simultaneously allocated in regards to a radio resource allocated in a previous frame or reserved with a fixed allocation.

An exemplary embodiment of the present invention provides a method of constructing a resource allocation map in a case where a base station allocates a radio resource to a plurality of mobile terminals by using a localized resource block in a mobile communication system, the localized resource block being a localized sub-channel composed of neighboring sub-carriers. The method includes including a mobile terminal identifier column in the resource allocation map, where identifiers of the mobile terminals are continuously displayed, setting an index for each mobile terminal according to an order in which the mobile terminal identifiers are displayed, and allocating an index of a mobile terminal corresponding to each of resource blocks of the radio resource for each resource block, the resource block being a unit of a minimal radio resource found by dividing a radio resource used when data is transmitted, and including an index bit pattern in the resource allocation map where indexes allocated for the individual resource blocks are arranged according to an order of the resource blocks included in the radio resource.

Another embodiment of the present invention provides a method of constructing a resource allocation map in a case where a base station allocates a radio resource to a plurality of mobile terminals by using a distributed resource block in a mobile communication system, the distributed resource block being a distributed sub-channel composed of distributed sub-carriers. The method includes including a mobile terminal identifier column in the resource allocation map where identifiers of the mobile terminals are continuously displayed according to an order in which the radio resource is allocated to the mobile terminals, setting a toggle bit to each mobile terminal according to an order in which the mobile terminal identifiers are displayed, and allocating a toggle bit of a mobile terminal corresponding to a resource block of the radio resource for each resource block, the resource block being a unit of a minimal radio resource found by dividing a radio resource used when data is transmitted, and including a toggle bit pattern in the resource allocation map where the toggle bits allocated for the individual resource blocks are arranged according to the order of the resource blocks included in the radio resource.

Still another embodiment of the present invention provides a method of constructing a resource allocation map in a case where a base station in a mobile communication system allocates a radio resource to a plurality of mobile terminals, the radio resource including resource blocks having an allocation period of one frame or more in a map of a previous frame or being reserved with a fixed allocation, the resource block being a unit of a minimal radio resource found by dividing a radio resource used when data is transmitted. The method includes constructing a bit column including classification information corresponding to a resource block allocated in a current frame among the entire radio resource and including the bit column in the resource allocation map, and including a localized resource block bit pattern in the resource allocation map, including classification information of a localized resource block and a distributed resource block included in the resource block included in the resource block allocated in the current frame.

Yet still another embodiment of the present invention provides a method of constructing a resource allocation map in a case where a base station in a mobile communication system allocates a radio resource by using sub-maps and a main map, the sub-maps including radio resource allocation information for mobile terminals, the main map including information for a location of the radio resource used for transmission of the sub-maps and a modulation and coding scheme. The method includes constructing a bit column including classification information corresponding to a resource block allocated in a current frame in the entire radio resource, the resource block being a unit of a minimal radio resource found by dividing a radio resource used when data is transmitted, and including the bit column in the man map, including a localized resource block bit pattern in the main map, including classification information of a localized resource block corresponding to the resource block allocated in the current frame and a distributed resource block, and including sub-map usage information corresponding to whether the sub-maps are used in the main map, and classifying, when the sub-maps are used, a sub-map localized resource block and a sub-map distributed resource block for each sub-map.

BRIEF DESCRIPTION OF THE DRAWINGS

FIG. 17 is a diagram illustrating an example of a mother map that is constructed in a hierarchical pattern method in a case where a localized radio resource and a distributed radio resource according to a fourth exemplary embodiment of the present invention are mixed.

FIG. 18 is a diagram illustrating another example of a mother map that is constructed in a hierarchical pattern method in a case where a localized radio resource and a distributed radio resource according to a fourth exemplary embodiment of the present invention are mixed.

FIG. 19 is a diagram illustrating another example of a mother map that is constructed in a hierarchical pattern method in a case where a localized radio resource and a distributed radio resource according to a fourth exemplary embodiment of the present invention are mixed.

FIG. 21 is a diagram illustrating an example of a child map that is constructed in a hierarchical pattern method in a case where a localized radio resource and a distributed radio resource according to a fourth exemplary embodiment of the present invention are mixed.

FIG. 23 is a diagram illustrating an example of child MAP among the resource allocation map in a hierarchical pattern method in a case where a localized radio resource and a distributed radio resource according to a fourth exemplary embodiment of the present invention are mixed.

FIG. 26 is a diagram illustrating an example of a child map that is constructed in a hierarchical pattern method in a case where a localized radio resource and a distributed radio resource according to a fifth exemplary embodiment of the present invention are mixed.

FIG. 27 is a diagram illustrating an example of constructing a resource allocation map in a hierarchical pattern method and a start-length method in a case where a localized radio resource and a distributed radio resource according to a fifth exemplary embodiment of the present invention are mixed.

DETAILED DESCRIPTION OF THE EMBODIMENTS

Figure 1:
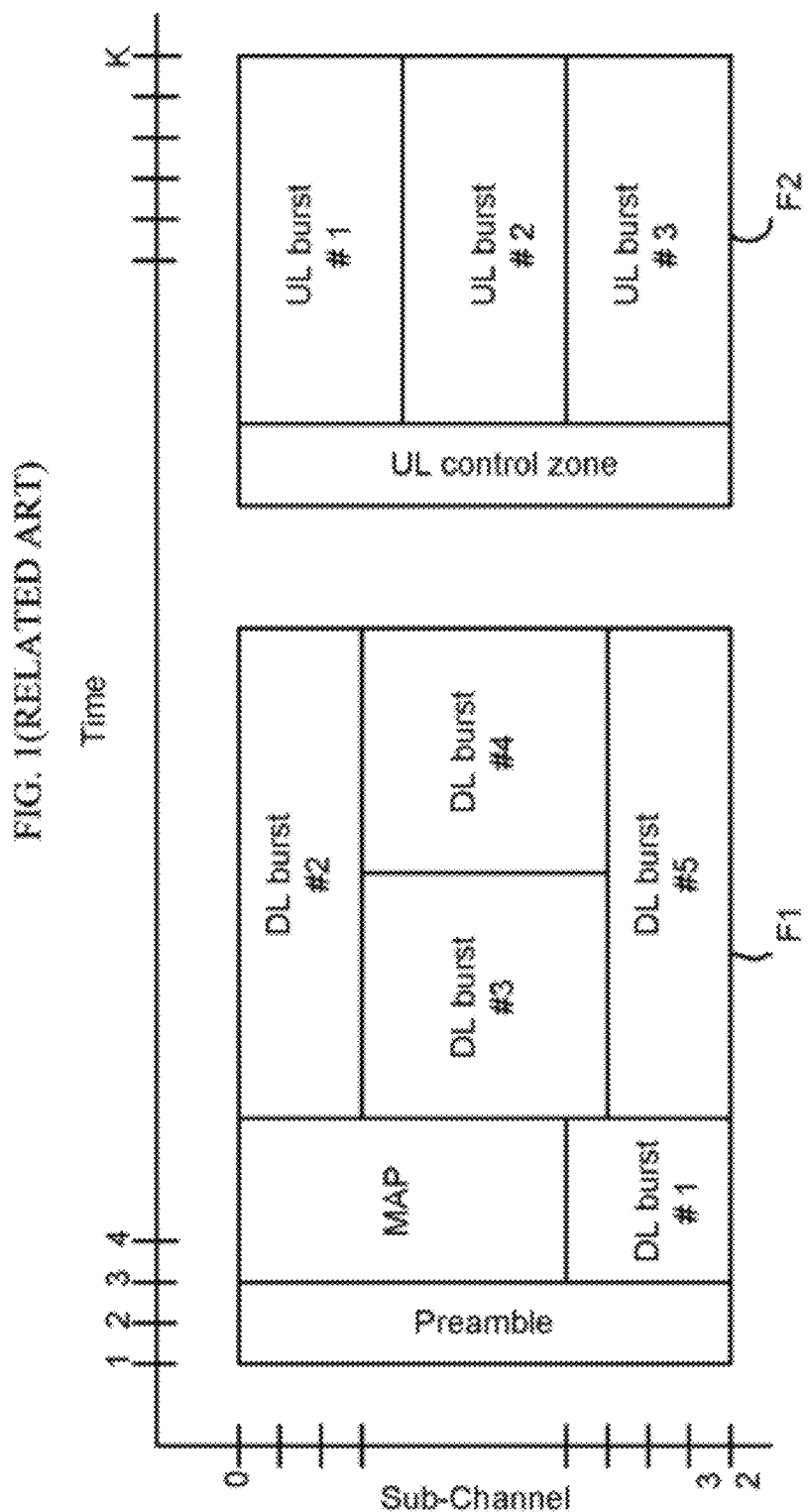
FIG. 1 is a diagram illustrating a data frame of an OFDMA mobile communication system.
Figure 2:
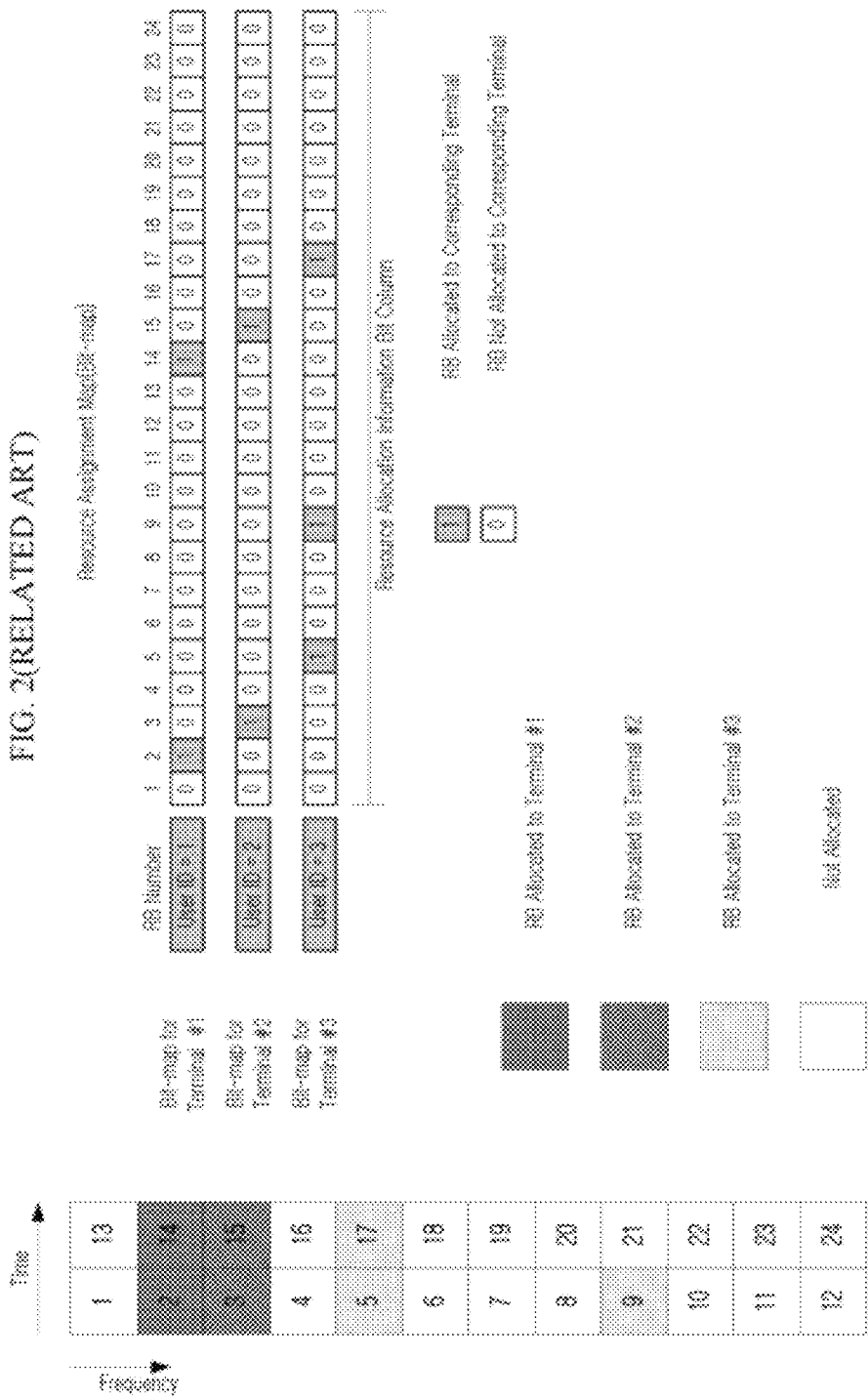
FIG. 2 is a diagram illustrating a method of constructing a resource allocation map in a bit-map method for a localized radio resource according to the prior art.
Figure 3:
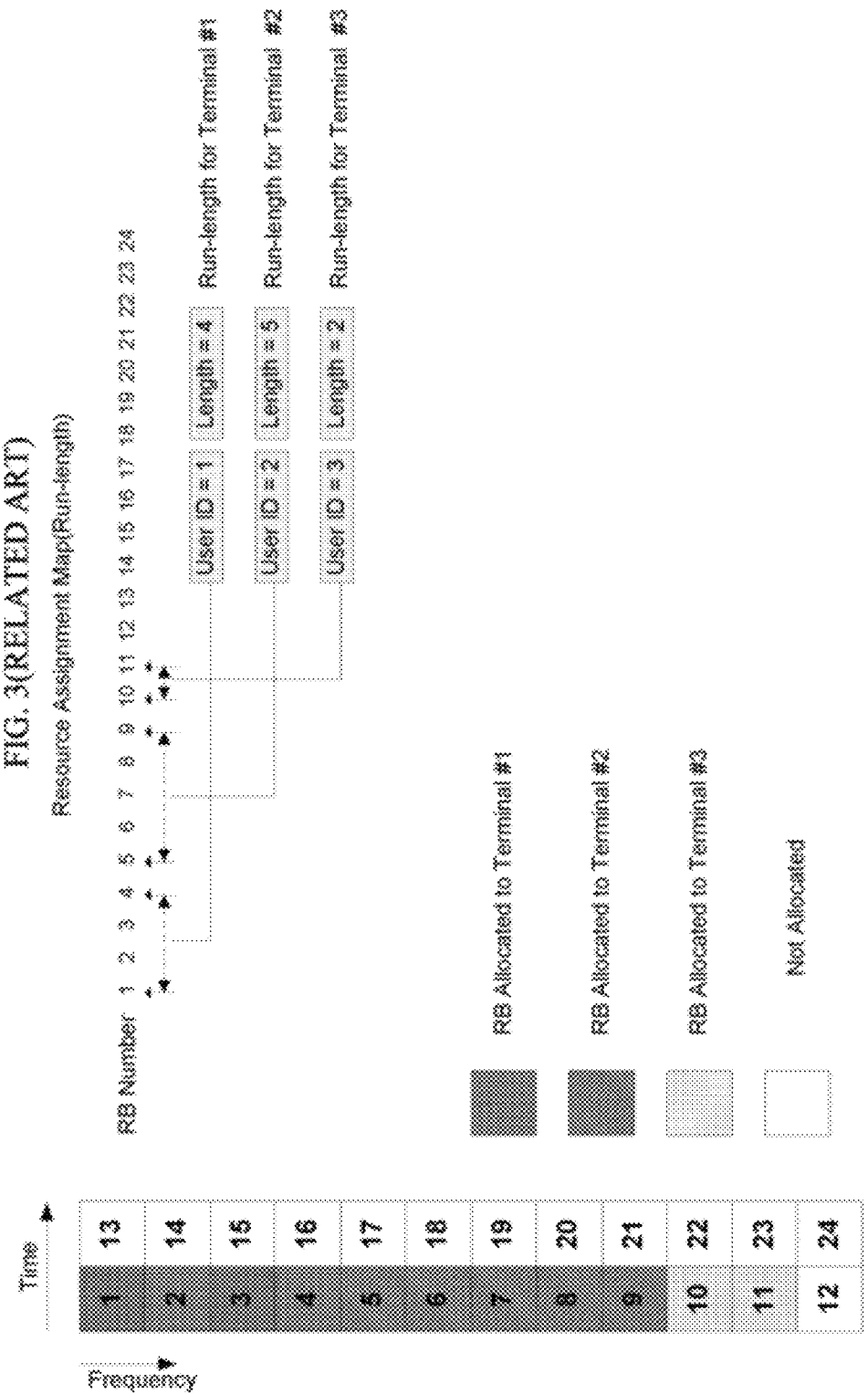
FIG. 3 is a diagram illustrating a method of constructing a resource allocation map in a run-length method for a distributed radio resource according to the prior art.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A method of constructing a map for a mobile communication system according to an exemplary embodiment of the present invention will now be described in detail with reference to the accompanying drawings.

Referring to the accompanying drawings, a method will be described in which a base station constructs resource allocation information in an index pattern method in a mobile communication system according to a first exemplary embodiment of the present invention.

Figure 6:
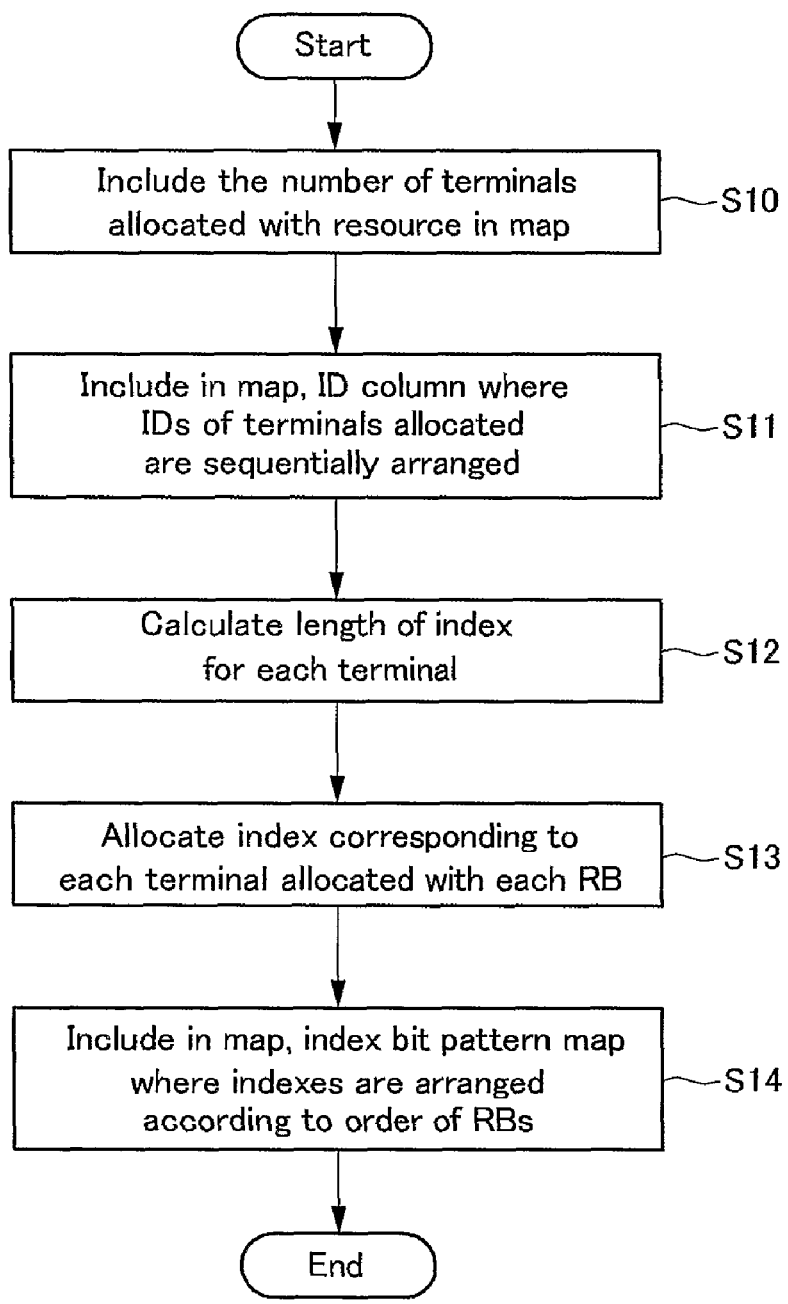
FIG. 6 is a flowchart illustrating a method of constructing a resource allocation map in an index pattern method for a localized radio resource according to a first exemplary embodiment of the present invention.

FIG. 6 is a flowchart illustrating a method of constructing a resource allocation map in an index pattern method for a localized radio resource according to a first exemplary embodiment of the present invention.

As shown in FIG. 6, in order to represent resource allocation information in the index pattern method, first, a base station locates the number of mobile terminals to which radio resources are allocated and an index identifier (ID) column where IDs of the corresponding mobile terminals are sequentially displayed to a map (Steps S10 and S11). At this time, generally, an ID of each of the mobile terminals has a bit length in a range of 8 to 16 bits according to an advance agreement between the base station and the mobile terminal.

Meanwhile, before allocating an index for each terminal, the base station performs a process of determining lengths of indexes according to the number of mobile terminals to which a radio resource is allocated. The base station may use index lengths that are determined according to the advance agreement between the base station and the terminals, or may determine and use index lengths adaptively for the number of mobile terminals without wasting bits. At this time, the number of bits $L_{INDEX}$ needed when representing one index becomes $L_{INDEX}=\lceil \log 2(M+1) \rceil$ according to the number M of mobile terminals in the case of considering indexes to be allocated to radio resources that are not allocated, and becomes $L_{INDEX}=\lceil \log 2(M) \rceil$ according to the number M of mobile terminals in the case of not considering indexes to be allocated to radio resources that are not allocated because the radio resources that are not allocated do not exist.

As such, if the index length is determined, the base station allocates an index to each mobile terminal as follows (Step S12). The indexes that are allocated to the mobile terminals are determined according to the order in which IDs of the mobile terminals are displayed. The base station shares a method of determining an index according to the advance agreement between the base station and the mobile terminals with the mobile terminals. As a result, even though index information allocated to the individual mobile terminals is not included in the map, each mobile terminal can estimate an index allocated to each mobile terminal according to the order in which the IDs of the mobile terminals are displayed.

Meanwhile, the base station uses one specific index in order to represent an RB not being allocated to all the mobile terminals in addition to an index allocated to each mobile terminal. In the first exemplary embodiment of the present invention, the base station uses an index 0 to represent an RB that is not allocated to all the mobile terminals. However, the present invention is not limited thereto. It is possible to change an index that corresponds to an RB that is not allocated according to the advance agreement between the base station and the mobile terminals.

The base station constructs resource allocation information in an index bit pattern that is constructed by arranging indexes corresponding to terminals that are allocated with RBs according to an order of the RBs in the entire radio resource (Step S13). The index bit pattern that is constructed in the above-described method is included in the map (Step S14) and is transmitted to each mobile terminal.

As such, when representing resource allocation information with the indexes, the total number of indexes used to represent radio resource allocation information is the same as the number of RBs that construct the entire radio resource.

Equation 3 described below represents the number of bits $X_{Index}$ of a map allocated to represent localized RB allocation information by using an index pattern method.

$$X_{Index}=M(L_{ID}+L_{TX})+N_{RB}\lceil \log_2(M+1) \rceil \qquad \text{(Equation 3)}$$

In this case, reference character M indicates the number of mobile terminals allocated, reference character $L_{ID}$ indicates bit lengths of IDs for discriminating mobile terminals, reference character $N_{RB}$ indicates the number of RBs, and reference character $L_{TX}$ indicates a bit length of a field that informs a transmission method.

When comparing the above-described Equation 1 and Equation 3, the condition $N_{RB}\lceil \log_2(M+1) \rceil<N_{RB}$ is satisfied. Therefore, it can be understood in a map representing a method using an index pattern method that the number of bits is small, as compared with a case in where a bit-map method is used. That is, when the same radio resource allocation is represented, the small number of bits is used, as compared with the case where the bit-map method is used, and thus a size of the map is decreased.

Figure 7:
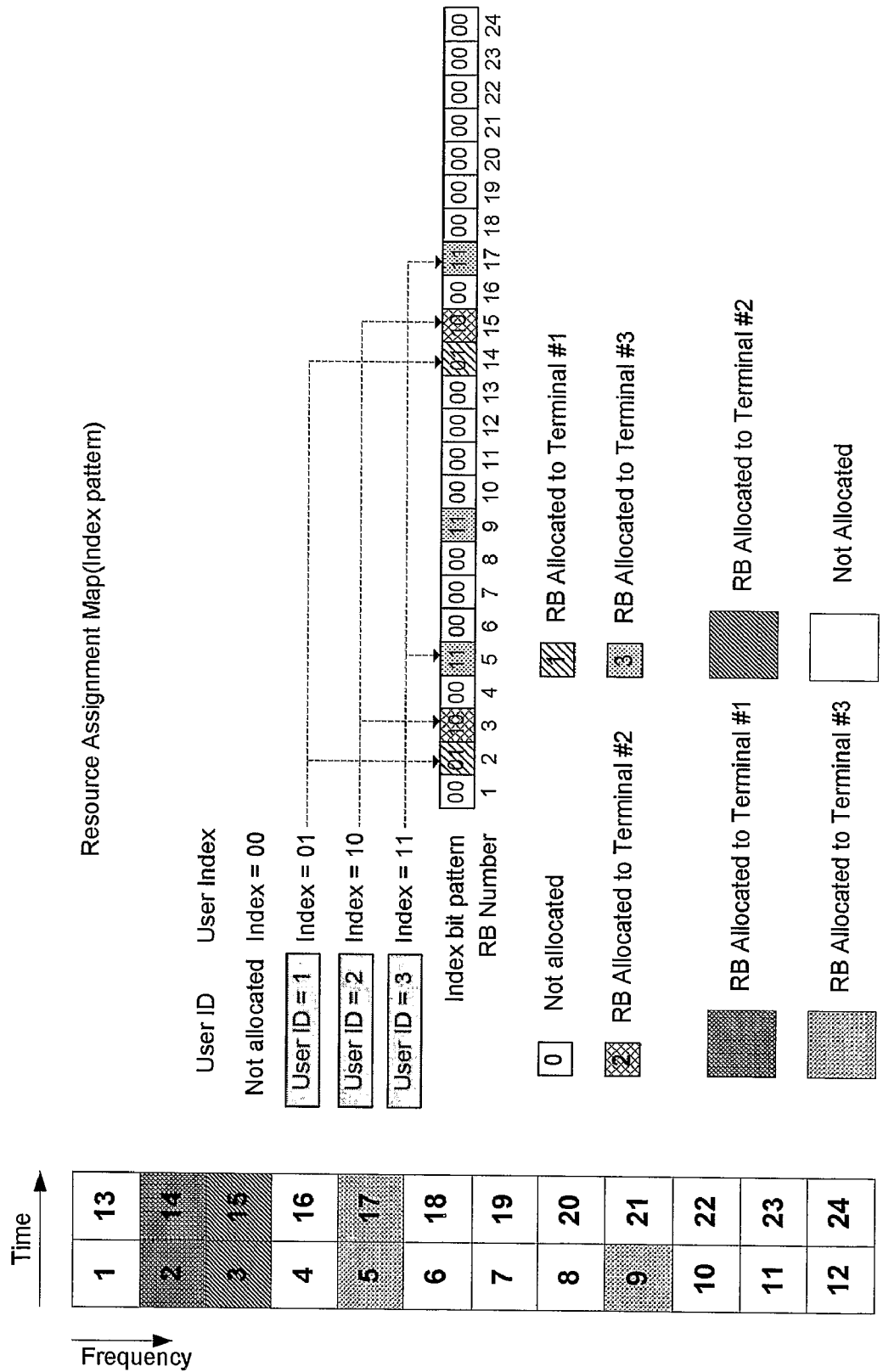
FIG. 7 is a diagram illustrating an example of constructing a resource allocation map in an index pattern method for a localized radio resource according to a first exemplary embodiment of the present invention.

FIG. 7 is a diagram illustrating a method of constructing a map in a case where a radio resource composed of twenty-four RBs according to a first exemplary embodiment of the present invention is allocated to three terminals using localized RBs.

In FIG. 7, the number of mobile terminals to which radio resources are allocated is three, and therefore the number of bits needed for each index is two. If the index length is determined, the base station sequentially arranges IDs of a terminal #1, a terminal #2, and a terminal #3, and includes the IDs in the map. The base station allocates an index 01 to the terminal #1, an index 10 to the terminal #2, and an index 11 to the terminal #3 according to the arrangement order of the IDs. Meanwhile, the base station allocates an index 00 to a radio resource that is not allocated to any of the mobile terminals.

Among the twenty-four localized RBs, the RBs allocated to the terminal #1 correspond to the second and fourteenth RBs, and thus 01 is allocated to the second and fourteenth indexes. Since the RBs allocated to the terminal #2 correspond to the third and fifteenth RBs, 10 is allocated to the third and fifteenth indexes. Since the RBs allocated to the terminal #3 correspond to the fifth, ninth, and seventeenth RBs, 11 is allocated to the fifth, ninth, and seventeenth indexes. In addition, 00 is allocated to the indexes corresponding to RBs that are not allocated to any of the mobile terminals. As such, if the indexes allocated for the RBs are sequentially arranged, an index bit pattern having the total length of 48 bits such as 00 01 10 00 11 00 00 00 11 00 00 00 00 01 10 00 11 00 00 00 00 00 00 00 is formed. The length of bits is smaller than the length of 72 bits needed to represent allocation information for a radio resource composed of twenty-four RBs to the three mobile terminals in a bit-map method.

Figure 8:
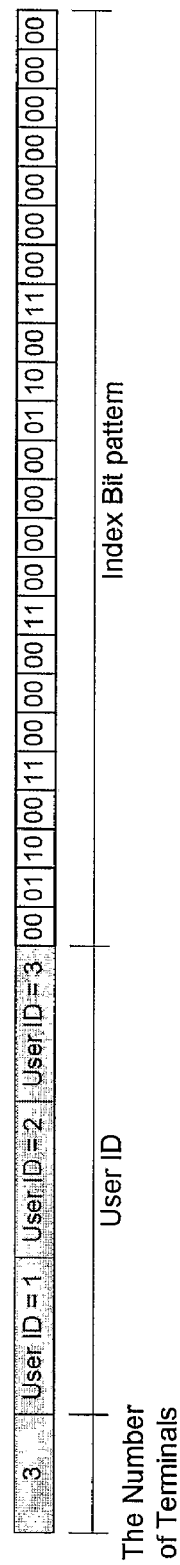
FIG. 8 is a diagram illustrating an example of a resource allocation map that is constructed in an index pattern method for a localized radio resource according to a first exemplary embodiment of the present invention.

FIG. 8 shows a portion of a resource allocation map that includes an index bit pattern shown in FIG. 7.

As shown in FIG. 8, the map includes information indicating the number of terminals to which the radio resources are allocated. The mobile terminal uses the information included in the map when the mobile terminal recognizes a region occupied by a terminal ID in the map and an index length. Further, although constituent elements, such as a field for informing a transmission method, are additionally needed in order to construct the map, the description thereof will be omitted because a person of ordinary skill in the art can easily embody an exemplary embodiment of the present invention.

Next, referring to the accompanying drawings, a method will be described in which a base station constructs resource allocation information in a toggle bit pattern in a mobile communication system according to a second exemplary embodiment of the present invention.

Figure 9:
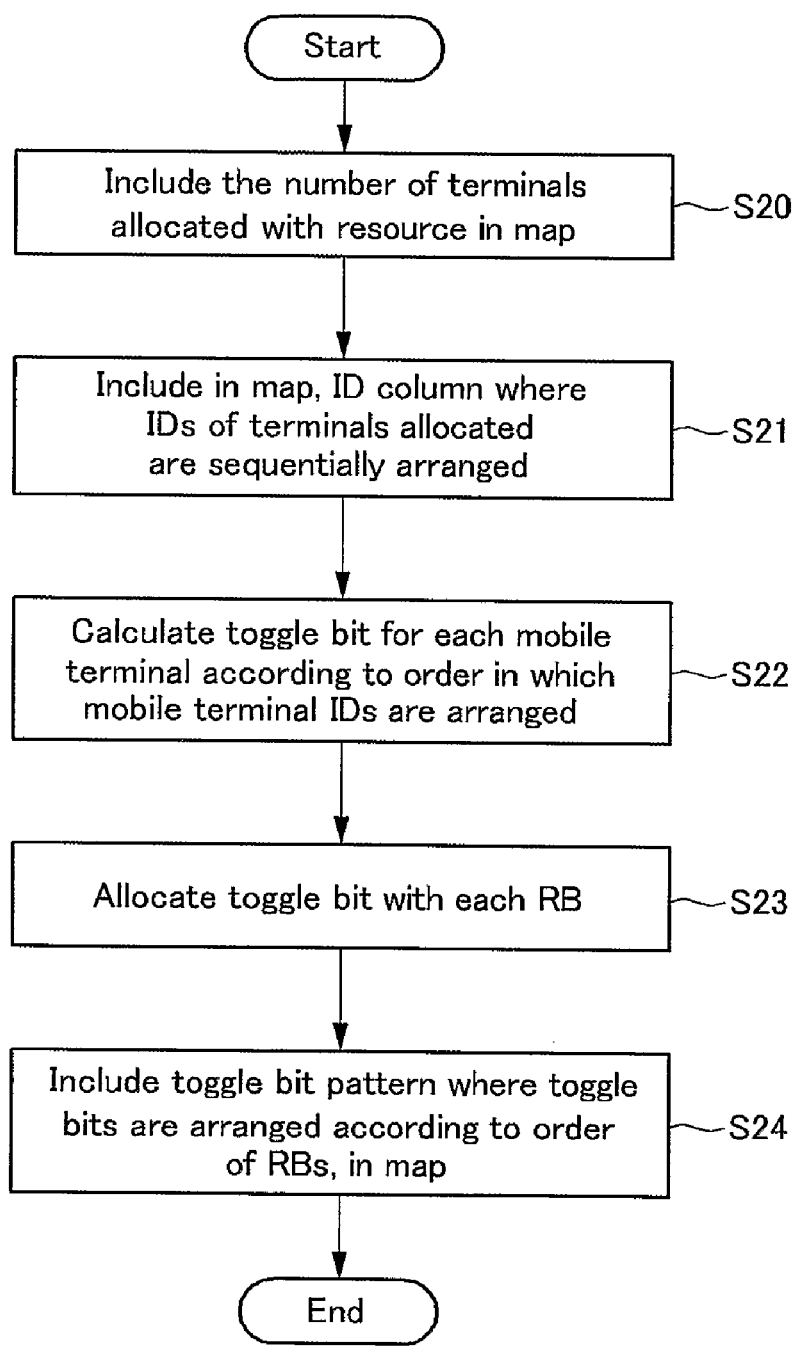
FIG. 9 is a flowchart illustrating a method of constructing a resource allocation map in a toggle pattern method for a distributed radio resource according to a second exemplary embodiment of the present invention.

FIG. 9 is a flowchart illustrating a method of constructing a resource allocation map in a toggle pattern method for a distributed radio resource according to a second exemplary embodiment of the present invention.

As shown in FIG. 9, in order to represent the resource allocation information in the toggle pattern method, first, a base station locates the number of mobile terminals to which radio resources are allocated and an identifier (ID) column where IDs of the corresponding mobile terminals are sequentially displayed to a map (Steps S20 and S21).

Then, the base station allocates toggle bits corresponding to the mobile terminals to which the radio resources are allocated (Step S22). At this time, toggle bit information that is allocated to the mobile terminals is not included in the map. The reason why the toggle bit information is not included in the map is as follows. That is, since the base station and the mobile terminals share a method of determining a toggle bit according to the advance agreement between the base station and the mobile terminals, even when the toggle bit information allocated to the mobile terminals is not included in the map, each mobile terminal can estimate a toggle bit that is allocated to each mobile terminal according to the order in which the IDs of the mobile terminals are displayed.

According to the second exemplary embodiment of the present invention, the toggle bits allocated to the mobile terminals are determined according to the order in which the IDs of the mobile terminals are displayed, that is, the order of the mobile terminals to which the radio resources are allocated, as described above. The toggle bit of the mobile terminal whose ID is first displayed starts from 1 (or 0), and the following mobile terminals use toggle bits obtained by toggling the toggle bits that are allocated to the mobile terminals prior to each terminal. That is, if the toggle bit allocated to the previous terminal is 1, the toggle bit 0 is used, and if the toggle bit allocated to the previous terminal is 0, the toggle bit 1 is used. According to the method of allocating a resource in the toggle pattern method, whenever the mobile terminals allocated with the radio resources vary, the toggle bit is toggled such that terminal allocation regions can be discriminated.

Meanwhile, when there is a radio resource that is not allocated to all of the terminals, the base station uses a toggle bit to represent information for the corresponding radio resource. When the RB that is not allocated is located at the front side of the entire radio resource, the base station uses a toggle bit obtained by toggling the toggle bit allocated to the first terminal. Further, as for the toggle bit that represents a radio resource remaining after being allocated to all the mobile terminals and allocation information for an RB located at the rear side of the entire radio resource and not allocated, a toggle bit that is obtained by toggling the toggle bit of the mobile terminal that is allocated with the radio resource directly before is used.

If a toggle bit allocated to each terminal is determined according to the order in which the IDs of the mobile terminals are displayed, the base station constructs a toggle bit pattern column obtained by arranging the toggle bits corresponding to the RBs according the order of the RBs (Step S23), and includes the toggle bit pattern in the map (Step S24). At this time, since the number of toggle bits needed for representing allocation information for each RB is one, the total number of bits of the toggle bit pattern needed for representing allocation information for all the radio resources is the same as the number of RBs included in the entire radio resource.

Equation 4 represents the number of bits $X_{TOGGLE}$ of the map that includes distributed RB allocation information represented in a toggle pattern method, as described above.

$$X_{Toggle} = M(L_{ID} + L_{TX}) + N_{RB} \quad \text{(Equation 4)}$$

In this case, reference character M indicates the number of mobile terminals allocated, reference character $L_{ID}$ indicates bit lengths of IDs for discriminating mobile terminals, reference character $N_{RB}$ indicates the number of RBs, and reference character $L_{TX}$ indicates the length of bits of a field that informs the number of mobile terminals allocated, a transmission method, and the like.

When compared with Equation $2X_{BitMap} = M(L_{ID} + \lceil \log_2 N_{RB} \rceil + L_{TX})$ that represents the number of bits needed for representing allocation information in the above-described run-length method, the condition $N_{RB} < (M(\lceil \log_2 N_{RB} \rceil))$ is generally satisfied, and thus the number of bits of the map required by the toggle pattern method is smaller than the number of bits of the map required by the run-length method.

Figure 10:
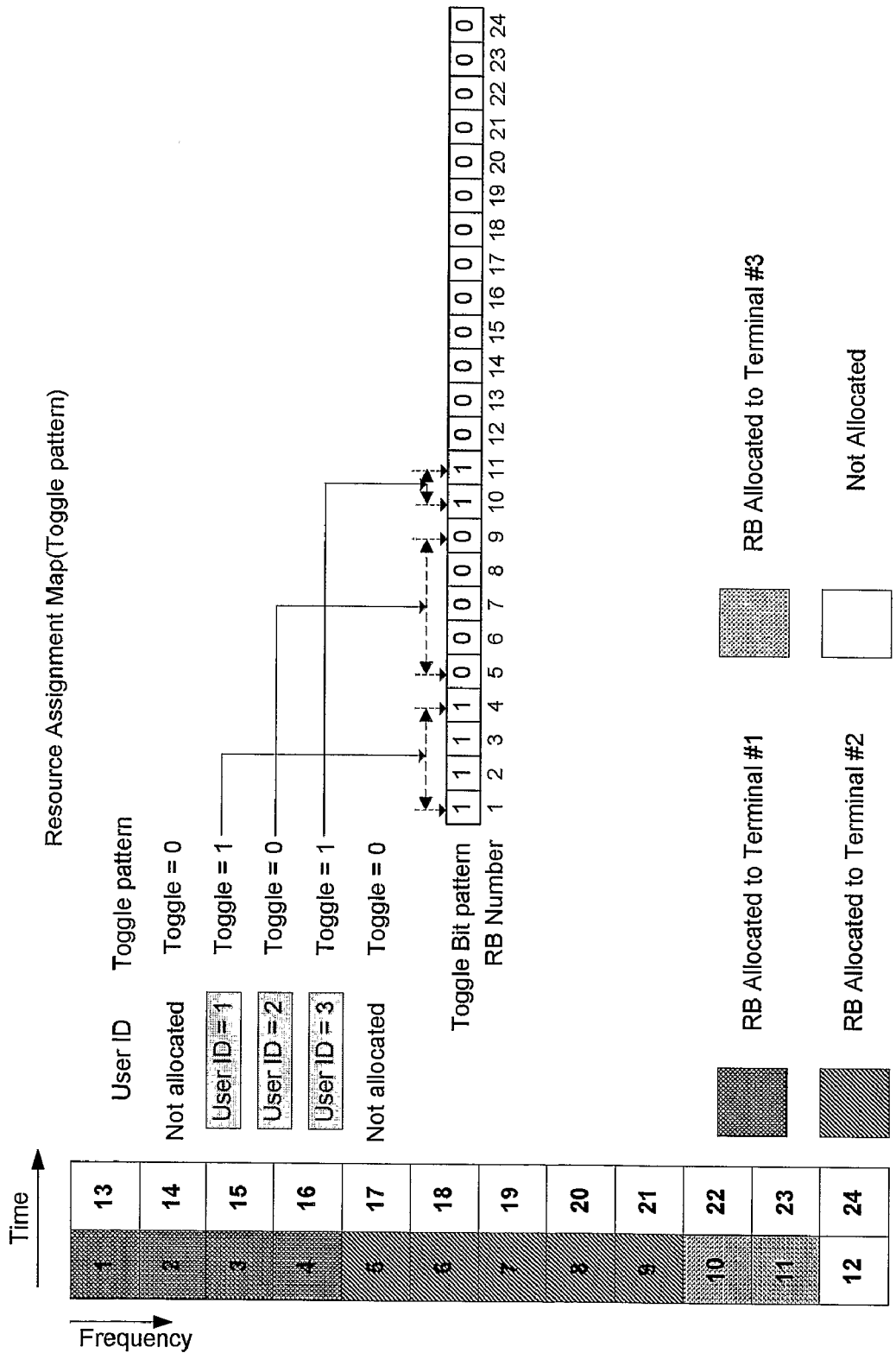
FIG. 10 is a diagram illustrating an example of constructing a resource allocation map in a toggle pattern method for a distributed radio resource according to a second exemplary embodiment of the present invention.

FIG. 10 shows an example of constructing a resource allocation map of a toggle pattern method for a distributed radio resource according to a second exemplary embodiment of the present invention, which specifically shows a method of constructing a map in a case where a radio resource composed of twenty-four RBs is allocated to three mobile terminals by using distributed RBs.

As shown in FIG. 10, three mobile terminals are allocated with a radio resource in the order of a terminal #1, a terminal #2, and a terminal #3, and therefore user IDs (mobile terminal identifiers) are arranged in the order of the terminal #1, the terminal #2, and the terminal #3.

Referring to the toggle bits that are allocated to the terminals according to the above-described ID arrangement order, the terminal #1 is allocated with a toggle bit 1, the terminal #2 is allocated with the toggle bit 0, and the terminal #3 is allocated with the toggle bit 1. Meanwhile, as for the toggle bits for representing the radio resource that is not allocated to all of the terminals, a toggle bit 0 is allocated to the radio resource that exists in front of the radio resource allocated to the terminal #1 and is not allocated, and a toggle bit 0 is allocated to a radio resource that exists in the back of the radio resource allocated to the terminal #3 and is not allocated. In this way, resource allocation regions are discriminated.

Meanwhile, since RBs that are not allocated do not exist at the front side of the radio resource, a toggle bit for each RB starts from a toggle bit corresponding to the terminal #1 that is first allocated with the radio resource. Then, since the first to fourth RBs are allocated to the terminal #1, resource allocation information is represented in a toggle bit pattern of 1111 for the four RBs. Further, since the fifth to ninth RBs are allocated to the terminal #2, a toggle bit pattern for the five RBs is represented as 00000. Furthermore, since the tenth and eleventh RBs are allocated to the terminal #3, resource allocation information is represented in a toggle bit pattern of 11, and resource allocation information is represented in a toggle bit pattern of 0000000000000 for twelfth to twenty-fourth RBs that are not allocated to all of the terminals. The toggle bit pattern column 111100000110000000000000 that is constructed in the above-described method is included in the map, and is transmitted to the mobile terminals to inform resource allocation information.

Figure 11:
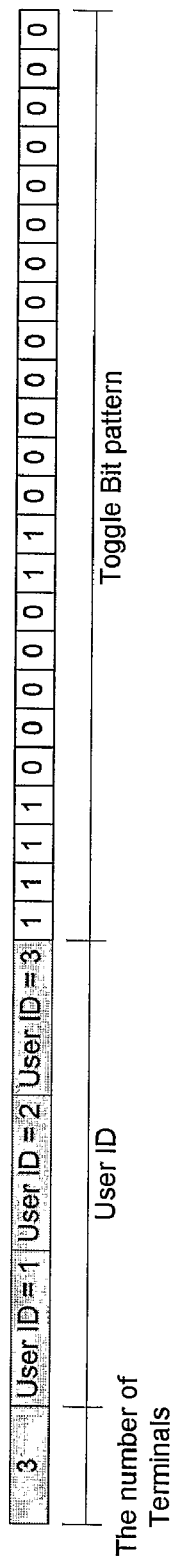
FIG. 11 is a diagram illustrating an example of a resource allocation map that is constructed in a toggle pattern method for a distributed radio resource according to a second exemplary embodiment of the present invention.

FIG. 11 shows a portion of a map that is constructed including a toggle bit pattern constructed in FIG. 10.

As shown in FIG. 11, the map includes information indicating the number of terminals to which the radio resource is allocated. This information is used when the mobile terminal recognizes a region occupied by a terminal ID in the map and calculates a toggle bit. Further, although constituent elements, such as a field for informing a transmission method, are additionally needed in order to construct the map, the description thereof will be omitted because a person of ordinary skill in the art can easily embody an exemplary embodiment of the present invention.

Next, referring to the accompanying drawings, a method will be described in which a base station constructs resource allocation information in a hierarchical pattern method in a mobile communication system according to a third exemplary embodiment of the present invention.

Figure 12:
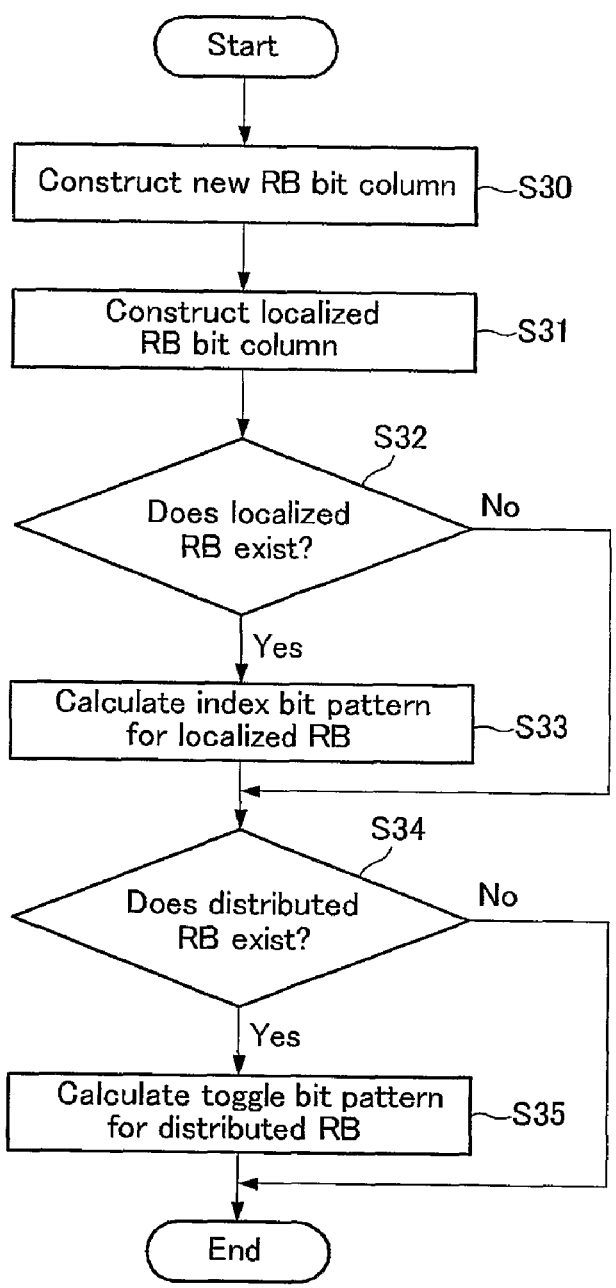
FIG. 12 is a flowchart illustrating a method of constructing a resource allocation map in a hierarchical pattern method in a case where a localized radio resource and a distributed radio resource according to a third exemplary embodiment of the present invention are mixed.

FIG. 12 is a flowchart illustrating a method of constructing a resource allocation map in a hierarchical pattern method in a case where a localized radio resource and a distributed radio resource according to a third exemplary embodiment of the present invention are mixed.

As shown in FIG. 12, when representing radio resource information in a hierarchical pattern method, first, the base station constructs a new RB bit pattern (new RB bit pattern) composed of classification information using an old RB and a new RB by using a bit-map method for the entire radio resource (Step S30). At this time, the length of the constructed New RB bit pattern is the same as the number of all RBs in the radio resource.

In this case, the term "old RB" means a radio resource RB that is allocated until the current frame from the previous frame or reserved with fixed allocation, and the term "new RB" means an RB that is newly allocated in the current frame. Meanwhile, according to a method of constructing a new RB bit pattern, a bit pattern is constructed with bits in which 1 is allocated to a new RB and 0 is allocated to an old RB. The length of the new RB bit pattern that is constructed in the above-described method is the same as the number of RBs that construct the entire radio resource. Alternatively, according to the method of constructing the above-described new RB bit pattern, 0 may be allocated to the new RB, and 1 may be allocated to the old RB.

As described above, the base station collects new RBs after constructing the new RB bit pattern, classifies the new RBs into localized RBs and distributed RBs, and constructs the localized RB bit pattern in the bit-map method (Step S31). Meanwhile, according to a method of constructing a localized RB bit pattern, a bit pattern is constructed with bits in which 1 is allocated to a new RB when the new RB is a localized RB and 0 is allocated to a new RB when the new RB is a distributed RB. The length of the localized RB bit pattern that is constructed in the above-described method is the same as the number of new RBs.

Alternatively, according to the method of constructing the above-described localized RB bit pattern, the method may be changed such that 0 may be allocated to the localized RB, and 1 may be allocated to the distributed RB.

As such, after the new RBs are classified into the localized RBs and the distributed RBs, the base station constructs resource allocation information for each localized RB and each distributed RB.

When the classified localized RB exists (Step S32), the base station constructs mobile terminal allocation information for a localized RB as an index bit pattern by using an index pattern method (Step S33). At this time, in addition to the index bit pattern, the number of terminals that are allocated with the radio resource, IDs of the terminals, and the like are included in the map by using the localized RBs, and a method of constructing the map is the same as that in the above-described first exemplary embodiment. Therefore, the detailed description will be omitted. However, instead of constructing the resource allocation information for the entire radio resource in an index pattern method, the indexes are allocated to the localized RBs in the new RBs, and thus the index pattern is constructed. Therefore, the length of the index bit pattern is calculated by an Equation $N_{LRB} \lceil \log_2(M+1) \rceil$ or $N_{LRB} \lceil \log_2(M) \rceil$ according to the number $N_{LRB}$ of localized RBs and the number M of mobile terminals that are allocated with the localized RBs.

Meanwhile, when the classified distributed RBs exist (Step S34), the mobile terminal allocation information for the distributed RB is constructed in the toggle bit pattern by using the toggle pattern method (Step S35). At this time, in the same manner as in the construction of the allocation information for the localized RBs, by using the distributed RBs, the number of terminals allocated with the radio resource, IDs of the terminals, and the like are included in the map, and the method of constructing the map is the same as that in the above-described second exemplary embodiment. Accordingly, the detailed description will be omitted. However, in this case, instead of constructing the resource allocation information for the entire radio resource in the toggle bit pattern, the toggle bits are allocated to the distributed RBs in the new RBs. The length of the toggle bit pattern corresponds to the number of distributed RBs.

Figure 13:
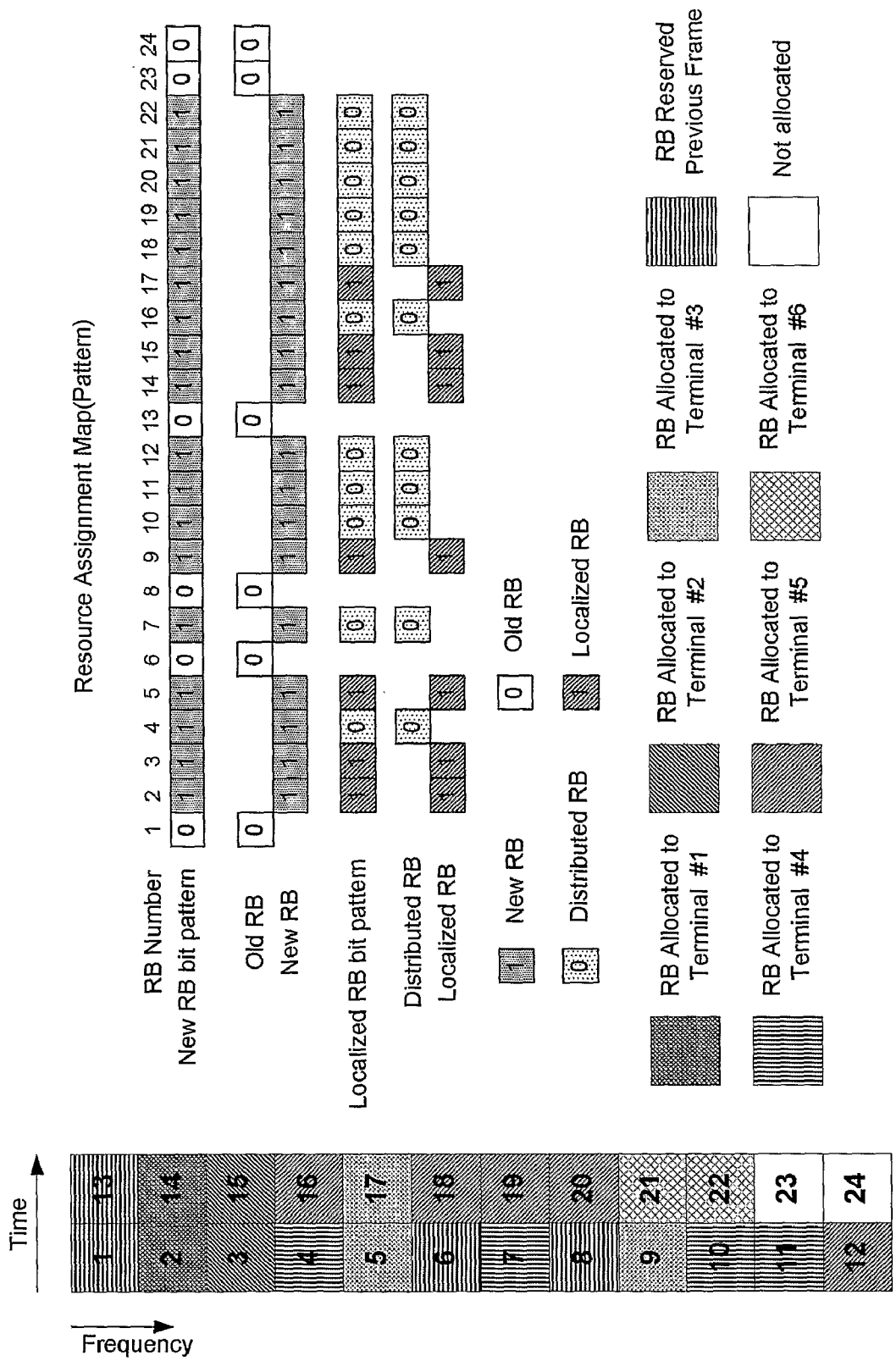
FIG. 13 is a diagram illustrating an example of new RB bit pattern and localized RB bit pattern among the resource allocation map in a hierarchical pattern method in a case where a localized radio resource and a distributed radio resource according to a third exemplary embodiment of the present invention are mixed.
Figure 14:
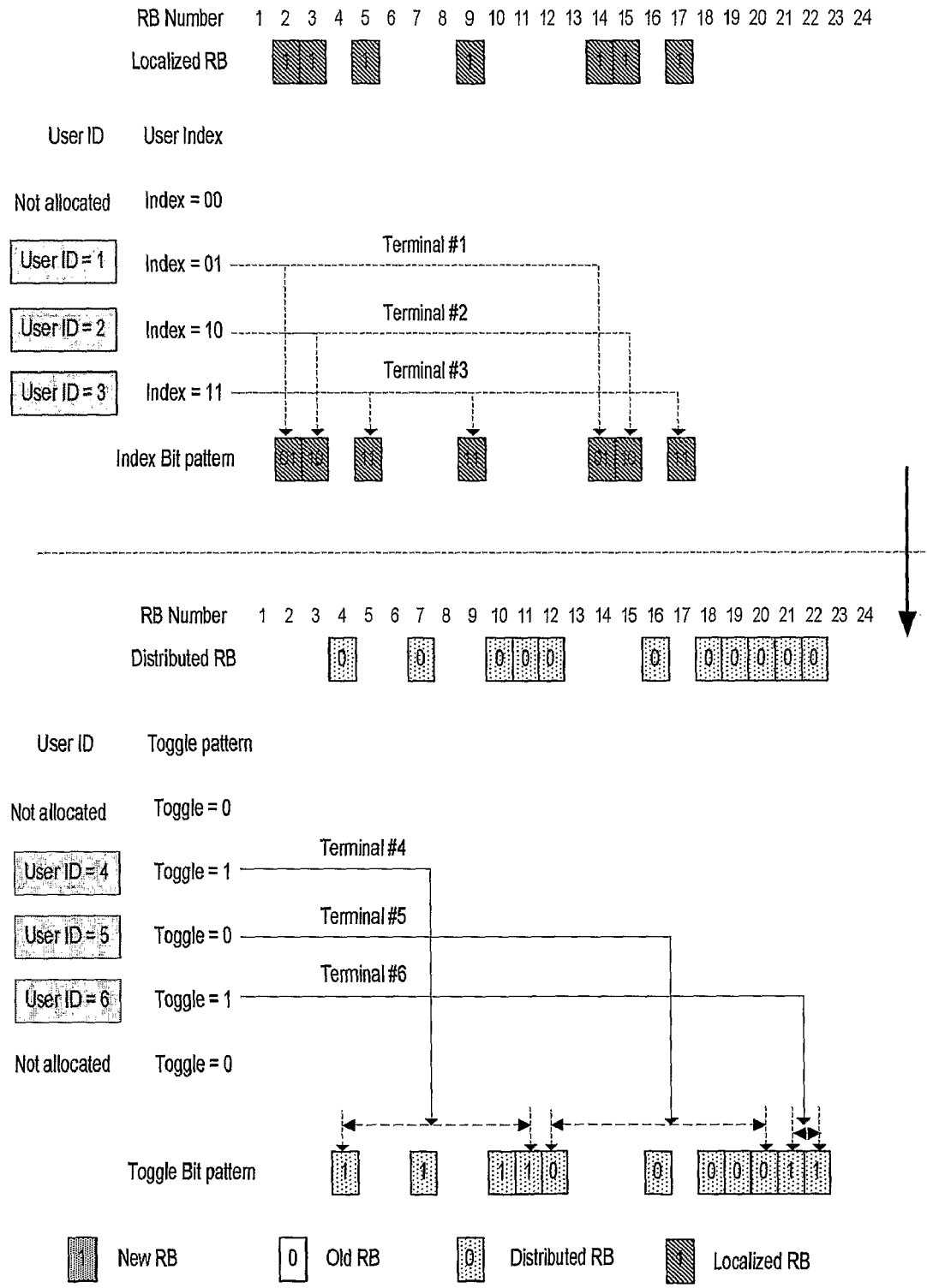
FIG. 14 is a diagram illustrating an example of index bit pattern and toggle bit pattern among the resource allocation map in a hierarchical pattern method in a case where a localized radio resource and a distributed radio resource according to a third exemplary embodiment of the present invention are mixed.

FIG. 13 and FIG. 14 show an example of constructing a resource allocation map in a hierarchical pattern method in a case where a localized radio resource and a distributed radio resource according to a third exemplary embodiment of the present invention are mixed, which shows a construction of resource allocation information in a case where a resource is allocated to six terminals by simultaneously using localized RBs and distributed RBs with respect to a radio resource including old RBs.

FIG. 13 shows new RB bit pattern and Localized RB bit pattern, and FIG. 14 shows Index bit pattern about localized RBs and toggle bit pattern about distributed RBs.

As shown in FIG. 13 and FIG. 14, first, the base station constructs a new RB bit pattern in such a manner that when each RB is an old RB, a bit 0 is allocated to each RB, and when each RB is a new RB, a bit 1 is allocated to each RB. Since the first, sixth, eighth, thirteenth, twenty-third, and twenty-fourth RBs are old RBs, the entire new RB bit pattern is constructed with a bit column 011110101111011111111100 that is composed of twenty-four bits and has bits of the same number as the total number of RBs, and is included in the map.

Further, the base station includes in the map, the localized RB bit pattern 110101000110100000 having 18 bits in which when each new RB is a distributed RB, the bit 0 is allocated to each new RB, and when each new RB is a localized RB, the bit 1 is allocated to each new RB.

Then, the base station represents the allocation information for the classified localized RBs in an index pattern method.

At this time, as shown in FIG. 14, in order to allocate the localized RBs to the terminal #1, the terminal #2, and the terminal #3, two bits are needed for each index. According to a predetermined method, the terminal #1 is allocated with the index 01, the terminal #2 is allocated with the index 10, and the terminal #3 is allocated with the index 11. Meanwhile, the radio resource that is not allocated to any of the terminals is allocated with the index 00. The index bit pattern that is constructed in the above-described method is composed of 14 bits in total because the total number of localized RBs is 7 and the length of the index is 2. Specifically, the index bit pattern becomes 01101111011011.

Then, the base station displays allocation information for the classified distributed RB in the toggle pattern method. As shown in FIG. 14, the mobile terminals that are allocated with the distributed RBs correspond to the terminal #4, the terminal #5, and terminal #6. As for the toggle bits that are allocated to the terminal #4, the terminal #5, and terminal #6, the terminal #4 is allocated with 1, the terminal #5 is allocated with 0, and the terminal #6 is allocated with 1. As such, if the toggle bit pattern is constructed by using the allocated toggle bits, the toggle bit pattern becomes 11110000011. Since the total number of distributed RBs is 11, the toggle bit pattern is composed of 11 bits.

Figure 15:
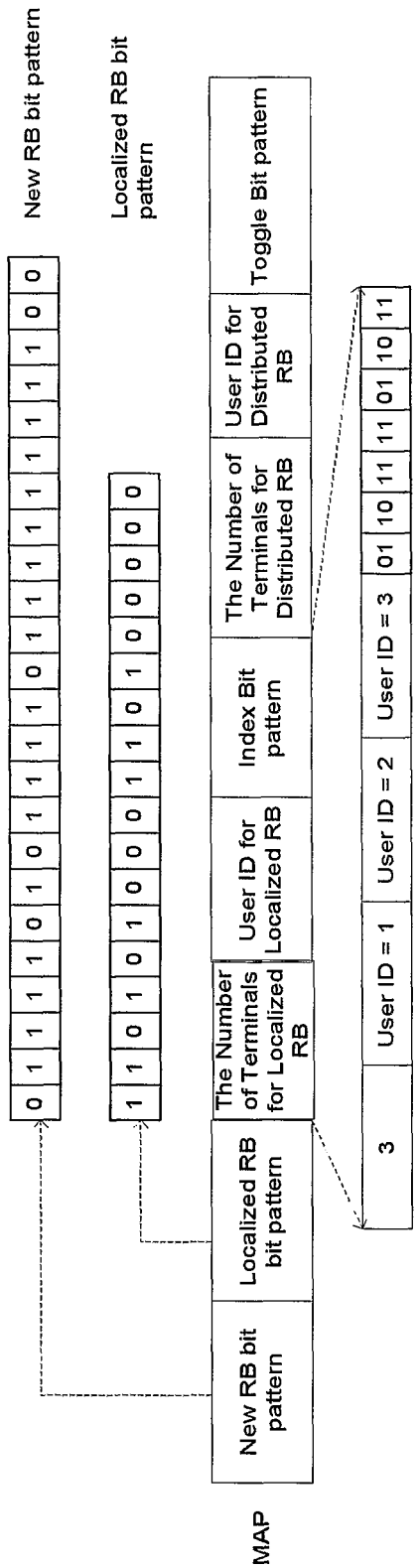
FIG. 15 is a diagram illustrating an example of a resource allocation map that is constructed in a hierarchical pattern method in a case where a localized radio resource and a distributed radio resource according to a third exemplary embodiment of the present invention are mixed.

FIG. 15 shows a portion of a map that includes a new RB bit pattern, a localized RB bit pattern, an index bit pattern, and a toggle bit pattern constructed in FIG. 13 and FIG. 14.

As described above, in the method of constructing resource allocation information in the hierarchical pattern method in which the localized RB and the distributed RB are classified, allocation information is displayed in an index pattern method for RBs corresponding to the localized RBs, and allocation information is displayed in the toggle bit pattern method for the distributed RB, so the allocation information for all the RBs can be displayed by using the smaller number of bits.

That is, as shown in FIG. 14, in order to allocate the localized RBs, display is made for the second, third, fifth, ninth, fourteenth, fifteenth, and seventeenth RBs that are recognized as the localized RBs. In order to allocate the distributed RBs, resource allocation information is allocated for eleven RBs that are recognized as the distributed RBs. Therefore, a smaller number of bits are needed, as compared with the case where allocation information is constructed for 24 RBs.

Figure 4:
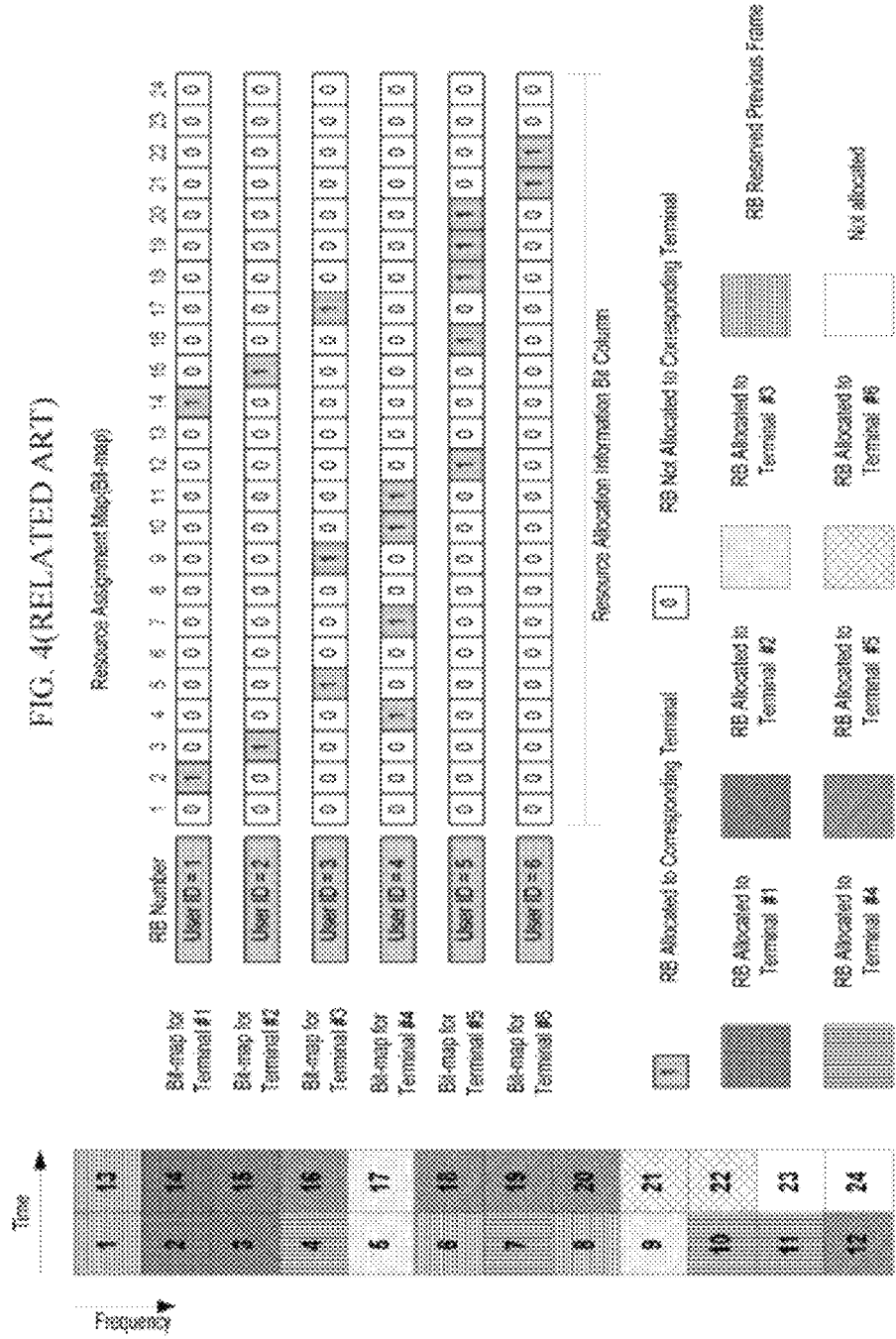
FIG. 4 is a diagram illustrating a method of constructing a resource allocation map in a bit-map method in a case where a localized radio resource and a distributed radio resource according to the prior art are mixed.
Figure 5:
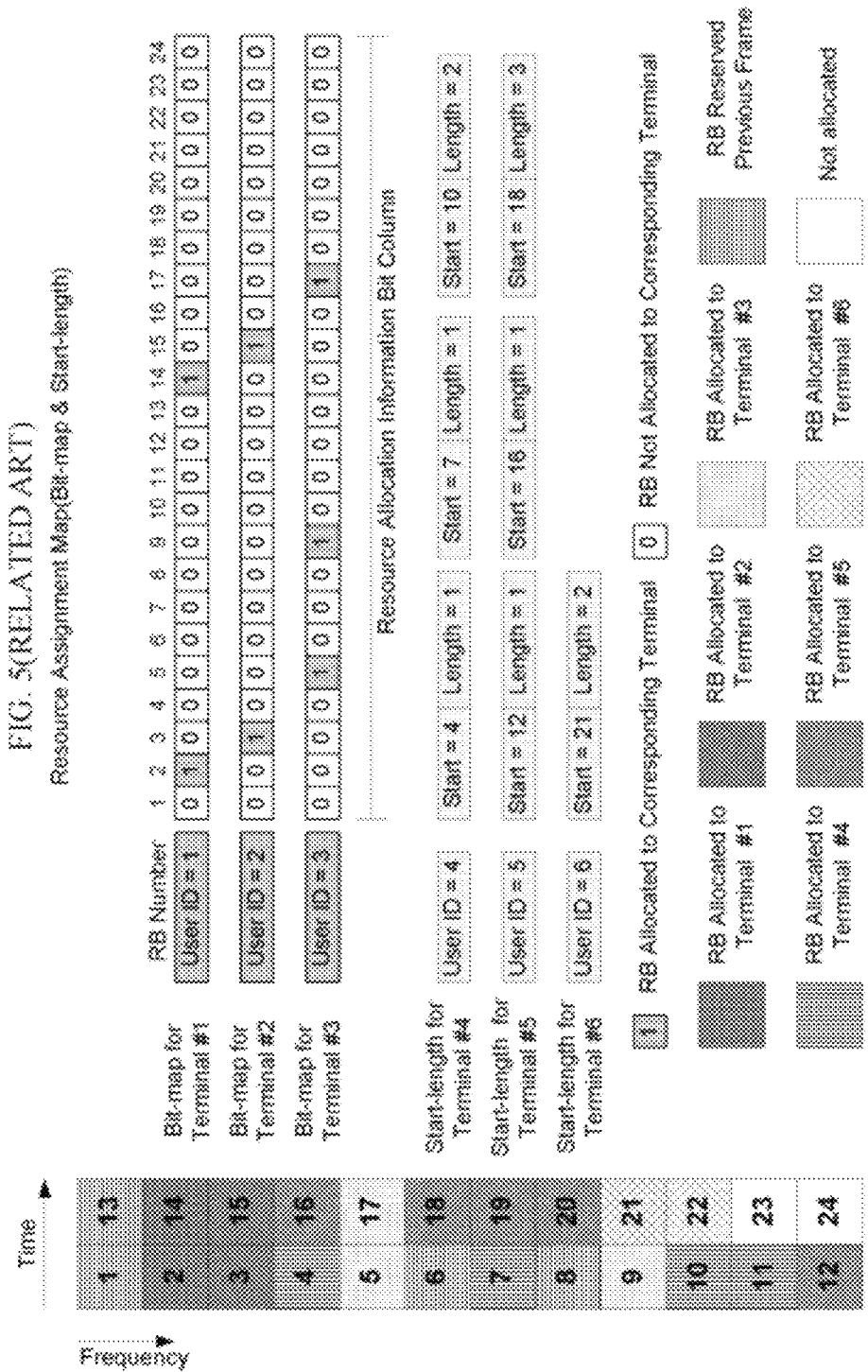
FIG. 5 is a diagram illustrating a method of constructing a resource allocation map in a bit-map method and a start-length method in a case where a localized radio resource and a distributed radio resource according to the prior art are mixed.

Specifically, if comparing FIGS. 4 and 13 in which the radio resource composed of 24 RBs is allocated to the six terminals including the terminals #1 to #6 in the same construction, in order to represent resource allocation information for each terminal in the bit map method shown in FIG. 4, the total number of 24 bits is required. Therefore, in order to represent resource allocation information for the six terminals, 144 bits are needed.

Meanwhile, in FIG. 13 and FIG. 14, 67 bits are needed. Specifically, 24 bits are needed in order to discriminate the new RBs and the old RBs, 18 bits are needed in order to discriminate the localized RBs and the distributed RBs for the new RBs, 14 bits are needed in order to represent allocation information for the localized RB, and 11 bits are needed to represent the allocation information for the distributed RB. As shown in FIG. 4, it is possible to construct a map having a smaller size, as compared with the method in which resource allocation information for the terminals is represented by using the bit-map.

Meanwhile, in an example of constructing the resource allocation information in the hierarchical pattern method, the old RB is allocated until the current frame from the previous frame, or only the radio resource RB reserved with the fixed allocation is included. However, the present invention is not limited thereto. It may be changed to include the remaining RBs, except for the RBs that are actually allocated to the mobile terminals in the current frame according to the advance agreement between the base station and the mobile terminals.

As such, if the old RBs include the remaining RBs except for the RBs that are actually allocated to the mobile terminals in the current frame, the new RB bit pattern is changed to represent it. Further, the localized RB bit pattern is changed to be displayed for the RBs that are actually allocated to the mobile terminals in the current frame.

This affects the process of constructing the index bit pattern for the localized RB. In the previous steps, when the localized RBs are discriminated, the localized RBs are discriminated except for the RBs that are not allocated. Therefore, even though the indexes are not allocated to the RBs that are not allocated, it is possible to implement the index bit pattern. Accordingly, as in FIG. 14, since the indexes do not need to be allocated to the RBs that are not allocated, the bit number for each index can be calculated by Equation $\lceil \log_2 (M) \rceil$.

Further, when one terminal exists that is allocated with the localized RB, since the localized RB allocation information for the corresponding terminal is included in the previously implemented localized RB bit pattern, the separate index bit pattern becomes unnecessary.

Meanwhile, if the old RBs include the remaining RBs except for the RBs that are allocated to the mobile terminals in the current frame, this affects the process of constructing the toggle bit pattern for the distributed RBs. In previous steps, when the distributed RBs are discriminated, the RBs are discriminated except for the RBs that are not allocated. Therefore, even though the toggle bits are not allocated to the RBs that are not allocated, it is possible to implement the toggle bit pattern.

Further, when one terminal that is allocated with the distributed RB exists, the distributed RB allocation information for the corresponding terminal is included in the previously implemented localized RB bit pattern. Therefore, the separate toggle bit pattern becomes unnecessary.

As such, according to the method of constructing the old RB, the method of constructing the resource allocation information may be changed. The overall process is the same as the method of constructing the resource allocation information in the above-described hierarchical pattern method. The detailed description thereof will be omitted.

Next, referring to the accompanying drawings, a method will be described in which, in a mobile communication system according to a fourth exemplary embodiment of the present invention, a base station constructs a mother map and a child map including resource allocation information in a hierarchical pattern method.

Figure 16:
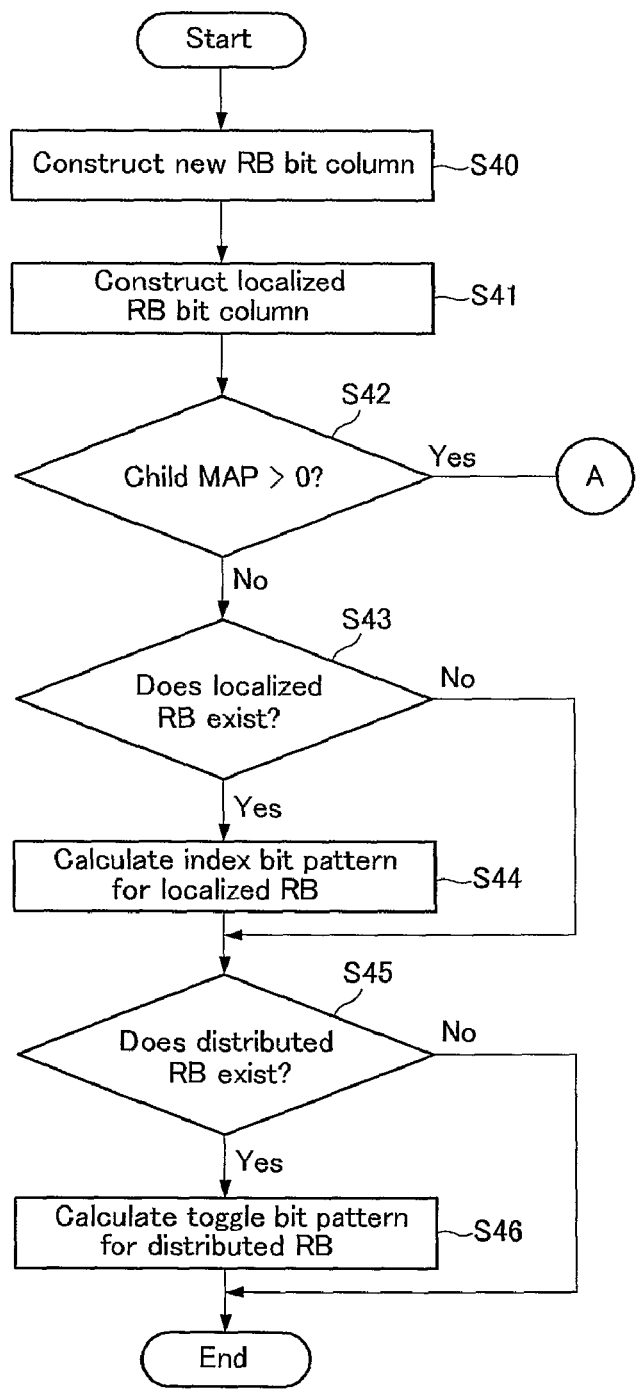
FIG. 16 is a flowchart illustrating a method of constructing a mother map in a hierarchical pattern method in a case where a localized radio resource and a distributed radio resource according to a fourth exemplary embodiment of the present invention are mixed.

FIG. 16 is a flowchart illustrating a method of constructing a mother map in a hierarchical pattern method in a case where a localized radio resource and a distributed radio resource according to a fourth exemplary embodiment of the present invention are mixed, which illustrates a case where one main map (mother map) and a plurality of sub-maps (child maps) are constructed in order to apply different modulation, coding, and transmission power to a map.

The mother map is transmitted by using a modulation and coding scheme having a low data rate such that all mobile terminals in a corresponding cell can receive the mother map. The radio resource allocation for a mobile terminal whose channel environment is poor is made in the child map that is transmitted by a modulation/coding scheme having a low data rate. This mobile terminal has deteriorated reception performance due to the poor channel environment. The mobile terminal may not receive a different child map that is transmitted by a modulation/coding scheme having a high data rate. Accordingly, in the mother MAP/child MAP structure, it needs to be represented such that a location of an RB allocated in each child map can be independently known regardless of a resource allocation in a different child MAP.

Similar to the above-described third exemplary embodiment of the present invention, in the mother map, in order to discriminate new RBs, a new RB bit pattern is displayed. In order to discriminate the localized RBs and the localized RBs for the new RBs, the localized RB bit pattern is displayed (Steps S40 and 41). Since this has been described, the detailed description will be omitted.

In the mother map, the number of RBs used for transmission of each child map and applied modulation/coding/power are displayed. Since the child maps are sequentially allocated right after the mother map in a data frame, the location of the radio resource used for transmission of each child map can be known by displaying the length, as in the run-length method.

When the child map is used, if the mother map is completely constructed, the base station classifies resource blocks for individual child maps, divides the resource blocks into localized RBs and classified RBs, and classifies the mobile terminals allocated with the corresponding resource blocks for each sub-map, such that they are used at the time of constructing the sub-map.

Meanwhile, when transmitting resource allocation information without using the child map (Step S43), the mother map is constructed in the same manner as the above-described third exemplary embodiment. That is, the index bit pattern and the toggle bit pattern for the localized RB and the distributed RB are included in the mother map (Steps S44, S45, and S46). The method of constructing the index bit pattern and the toggle bit pattern is the same as the method in the third exemplary embodiment, and thus the description thereof will be omitted.

FIG. 17 is a diagram illustrating an example of a mother map that is constructed in a hierarchical pattern method in a case where a localized radio resource and a distributed radio resource according to the fourth exemplary embodiment of the present invention are mixed.

As shown in FIG. 17, the mother map may have various fields that include an uplink power control and a response for an uplink HARQ transmission, in addition to the resource allocation information. These fields are displayed as fixed fields because it departs from the scope of the exemplary embodiment of the present invention.

In order to allocate the radio resource to the mobile terminals, first, the mother map includes a new RB bit pattern and a localized RB bit pattern. Therefore, all of the RBs of the corresponding frame are classified into a new RB, an old RB, a localized RB, and a distributed RB. Meanwhile, in the case of the resource allocation for the uplink frame, the current map can represent a resource allocation for a frame after the transmitted frame rather than the transmitted frame.

In the case of the small number of allocations, the allocations can be informed in the mother map even when the child map is not used. It is informed whether the child map is used or not by using the sub-map usage flag (Child MAP flag).

In the case where the child map is used, the child map displays the modulation and coding scheme used for the child map and the size of the radio resource used for transmission of the child map. The radio resource for the child map is sequentially allocated from the radio resource after the mother map.

When the child map is not used, the localized RB allocation and the distributed RB allocation are directly made in the mother map. In this case, the RB is allocated to each terminal according to the method that is described in the above-described third exemplary embodiment.

FIG. 18 is a diagram illustrating an example of constructing a mother map in a case where a child map exists according to the above-described method of constructing a mother map, and FIG. 19 is a diagram illustrating an example of constructing a mother map in a case where the child map is not used according to the above-described method of constructing the mother map.

Figure 20:
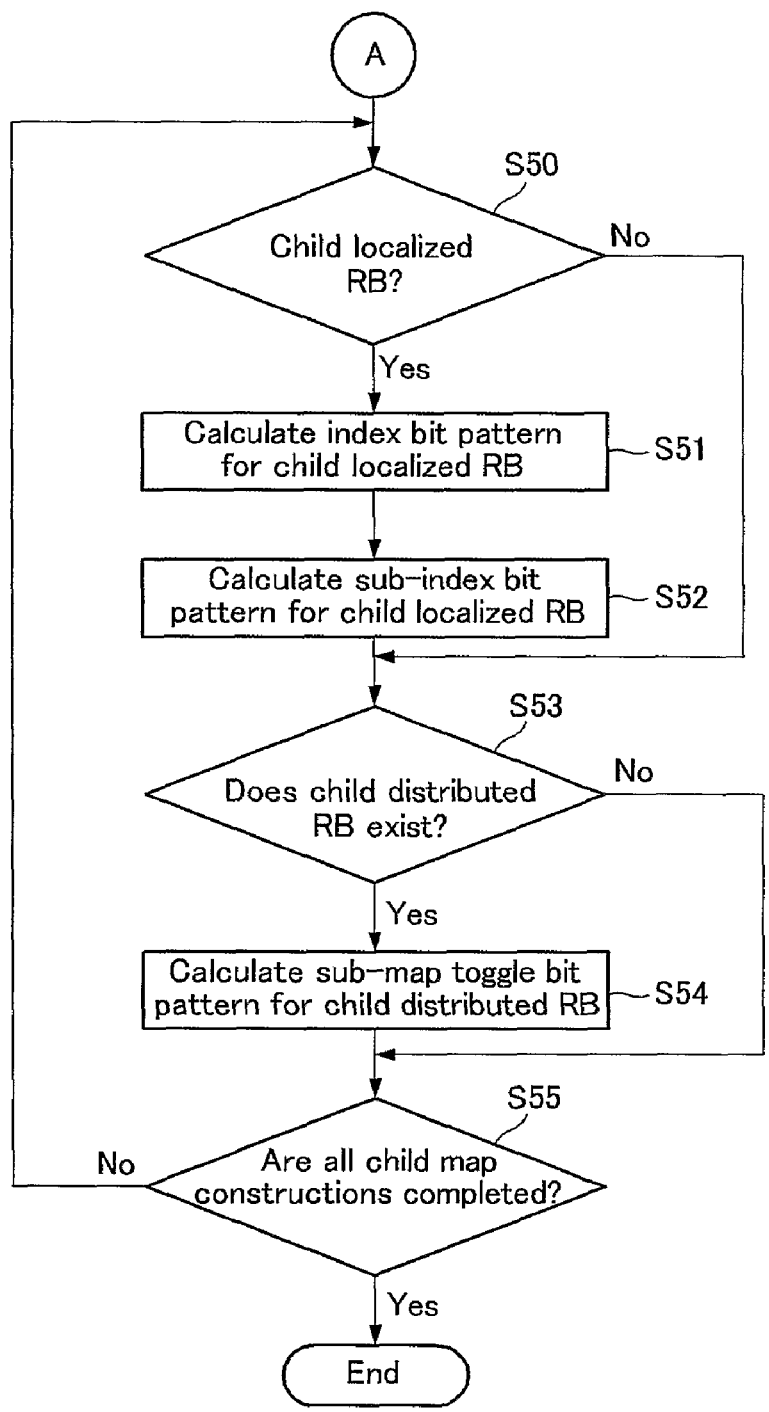
FIG. 20 is a flowchart illustrating a method of constructing a child map in a hierarchical pattern method in a case where a localized radio resource and a distributed radio resource according to a fourth exemplary embodiment of the present invention are mixed.

FIG. 20 is a flowchart illustrating a method of constructing a child map in a hierarchical pattern method in a case where a localized radio resource and a distributed radio resource according to a fourth exemplary embodiment of the present invention are mixed.

As shown in FIG. 20, the child MAP according to the fourth exemplary embodiment of the present invention uses an index pattern method in order to allocate the localized RB to each mobile terminal, and uses a toggle pattern method in order to allocate the distributed RB to each mobile terminal.

When the a localized RB exists in the child map (Step S60), in order to construct resource allocation information that is allocated to each mobile terminal in an index pattern method, first, a child localized RB (sub-map localized resource block) bit pattern is needed for representing the localized RB allocated to the corresponding child map. The child localized RB bit pattern is constructed to have the length that corresponds to the number of localized RBs classified in the mother map. 1 (or 0) is allocated for the localized RB allocated to the corresponding child map, and 0 (or 1) is allocated for the localized RB that is not allocated. The localized RB that is allocated is classified (Step S61).

As such, if the allocated child localized RB (sub-map localized resource block) is classified, the resource is allocated to each mobile terminal by using an index pattern method on the basis of information for the allocated child localized RB (Step S62). At this time, different from the index pattern method according to the above-described third exemplary embodiment, since an index is not allocated to a localized RB that is not allocated in each child map, the length of the indexes that correspond to the number M of the mobile terminals allocated with the child localized RBs becomes $\lceil \log_2(M) \rceil$ in each child map. This is because the child localized RB bit pattern includes information for the localized RB that is not allocated in the corresponding child map. In addition, in the child map, an index is allocated to each mobile terminal that is allocated with the child localized RB. Therefore, since the method of constructing the sub-map index bit pattern for the child localized RB is the same as the method of constructing resource allocation information in an index pattern method for the localized RB in the above-described third exemplary embodiment, the detailed description thereof will be omitted.

However, when the child localized RB needs to be allocated to one mobile terminal, since all of the RBs that are allocated to the corresponding child map in the child localized RB bit pattern are allocated to one mobile terminal, it is not necessary to separately construct a sub-map index bit pattern. That is, in this case, the sub-map index bit pattern is excluded from the map constituent elements.

Then, when the distributed RB allocated to the child map exists (Step S63), referring to the method of constructing the resource allocation information for the distributed RB in the toggle pattern method, first, the length of the sub-map toggle bit pattern for displaying allocation information for the distributed RB for each child map corresponds to the number of distributed RBs that are classified in the mother map.

Further, according to the method of constructing resource allocation information in a toggle pattern method for a distributed RB allocated to each child map, the toggle bit 0 (or 1) is allocated for the distributed RB that is used in the previous child map (previously allocated child map in a current frame), and for the distributed RB located after the allocated distributed RB, a resource allocation is performed by toggling the toggle bit that is allocated to the final distributed RB among the allocated distributed RBs. That is, when 1 is allocated to the final RB, 0 is allocated, and when 0 is allocated to the final RB, 1 is allocated (Step S65).

In addition, since the method of constructing resource allocation information in the toggle pattern method for the allocated distributed RB is the same as the method of allocating a resource in the toggle pattern method for the distributed RB in the above-described third exemplary embodiment, the detailed description thereof will be omitted.

Meanwhile, when the resource allocation information is completely constructed for one child map, the process of constructing the above-described resource allocation information is repeated until the child map included in the mother map is completely constructed (Step S66).

FIG. 21 is a diagram illustrating an example of constructing a child map that is constructed in a hierarchical pattern method in a case where a localized radio resource and a distributed radio resource according to a fourth exemplary embodiment of the present invention are mixed.

As shown in FIG. 21, each child map includes information of a localized RB allocation and a distributed RB allocation for mobile terminals.

Further, each child map includes a MAC ID field for discriminating terminals allocated with a resource, a type field for discriminating an uplink allocation or downlink allocation and representing information related to a transmission method, such as information for use in a multiplex antenna, a HARQ field for representing information related to HARQ, a TF field for representing a modulation and coding scheme used at the time of transmission, or the like. However, a detailed description will be omitted because it departs from the scope of the exemplary embodiment of the present invention.

Figure 22:
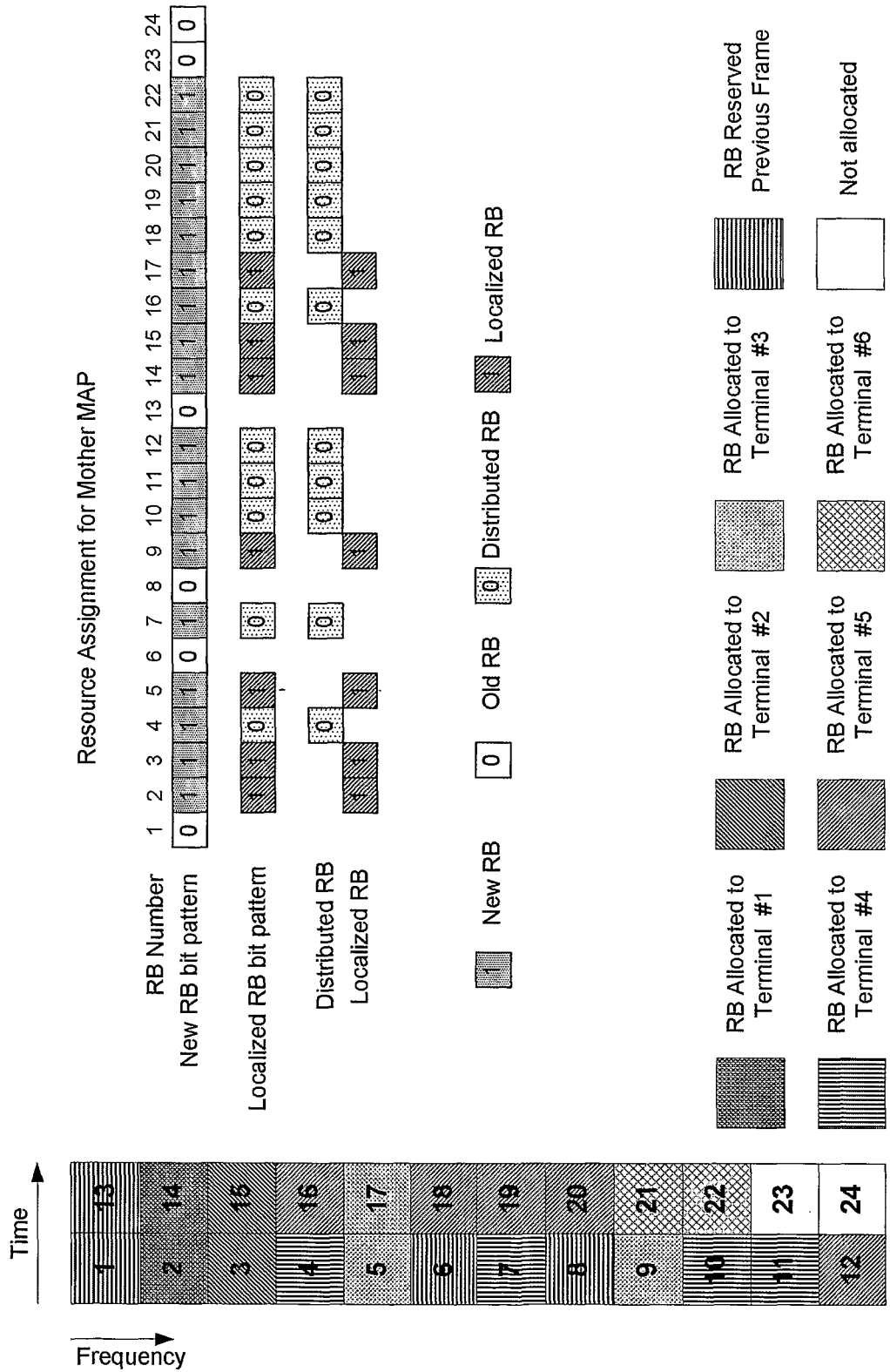
FIG. 22 is a diagram illustrating an example of mother MAP among the resource allocation map in a hierarchical pattern method in a case where a localized radio resource and a distributed radio resource according to a fourth exemplary embodiment of the present invention are mixed.

FIG. 22 and FIG. 23 shows a specific example of constructing a resource allocation map in a hierarchical pattern method in a case where a localized radio resource and a distributed radio resource according to a fourth exemplary embodiment of the present invention are mixed, FIG. 22 shows mother MAP, and FIG. 23 shows child MAP. Meanwhile, in FIG. 22, the structure of the radio resource, the structure of the mobile terminal allocated with the resource, and the structure of the radio resource allocated to the corresponding mobile terminal are the same in those of FIG. 13 that corresponds to the above-described third exemplary embodiment.

As shown in FIG. 22 and FIG. 23, when the mother map including the new RB bit pattern and localized RB bit pattern is completely constructed, the base station constructs a child localized RB bit pattern for each child map. In the case of the child map 1, the second, third, fourteenth, and fifteenth RBs among all of the localized RBs are allocated, and thus the child localized RB bit pattern is composed of a bit column of 1100110.

As such, the child localized RB bit pattern is constructed. Referring to the index bit pattern column that is constructed in the child map 1, the terminals that are allocated with the child localized RBs correspond to the terminal #1 and the terminal #2, the necessary length of the index becomes 1 according to Equation $\lceil \log_2(M) \rceil$, and the terminal #1 is allocated with an index 0 and the terminal #2 is allocated with an index 1. Therefore, if the sub-map index bit pattern for the child localized RB is constructed in the Child MAP1, the sub-map index bit pattern becomes 0101.

However, as in the child map 2, when the terminal #3 is only allocated with the child localized RB, the child localized RB bit pattern includes information for the localized RB that is allocated to the terminal #3. Therefore, it is not necessary to separately construct a sub-map index bit pattern.

Meanwhile, since the terminal allocated with the distributed RB in the child map 1 corresponds to the terminal #4, when it is constructed in the toggle bit pattern, the toggle bit 1 is allocated to the RB allocated to the terminal #4, and 0 is allocated to the other distributed RBs. In this way, the information can be displayed.

Figure 24:
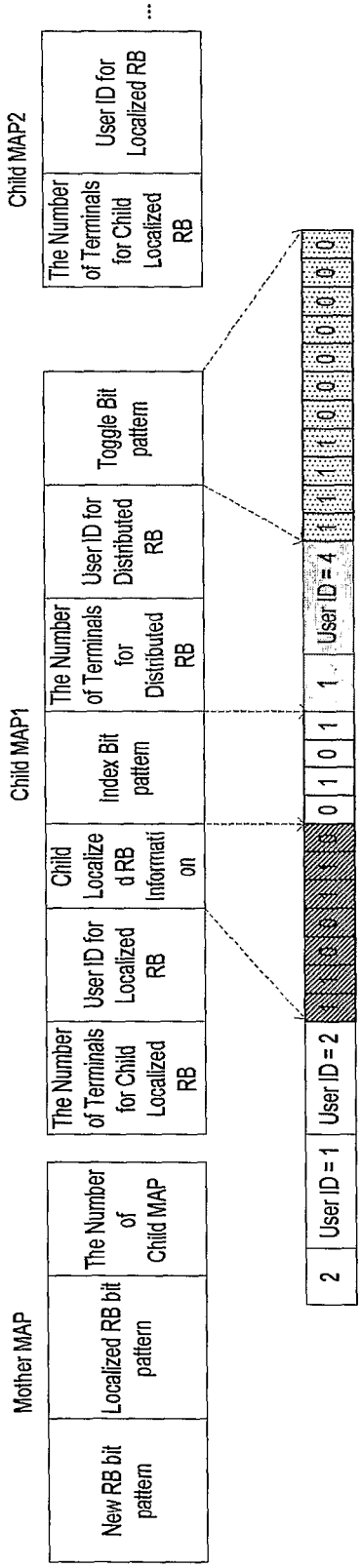
FIG. 24 is a diagram illustrating an example of a resource allocation map that is constructed in a hierarchical pattern method in a case where a localized radio resource and a distributed radio resource according to a fourth exemplary embodiment of the present invention are mixed.

FIG. 24 shows a portion of a resource allocation map that is constructed in the method shown in FIG. 22 and FIG. 23, which shows a mother map that includes a new RB bit pattern column and a localized RB bit pattern column, and a child map that includes a sub-map index bit pattern for a child localized RB and a sub-map toggle bit pattern for the child distributed RB.

As such, each child map separately manages information for the localized RB and the distributed RB allocated to each child map. According to the method of allocating a radio resource to mobile terminals on the basis of the above-described information, since each mobile terminal can receive a child map allocated to each mobile terminal regardless of receiving another child map and obtain resource allocation information, even when an error occurs when another sub-map (child map) is received, each mobile terminal can accurately know the location of the radio resource that is allocated to each mobile terminal.

Next, referring to the accompanying drawings, a method will be described in which in a mobile communication system according to a fifth exemplary embodiment of the present invention, a base station constructs a mother map and a child map including resource allocation information in a hierarchical pattern method and a start-length method.

Figure 25:
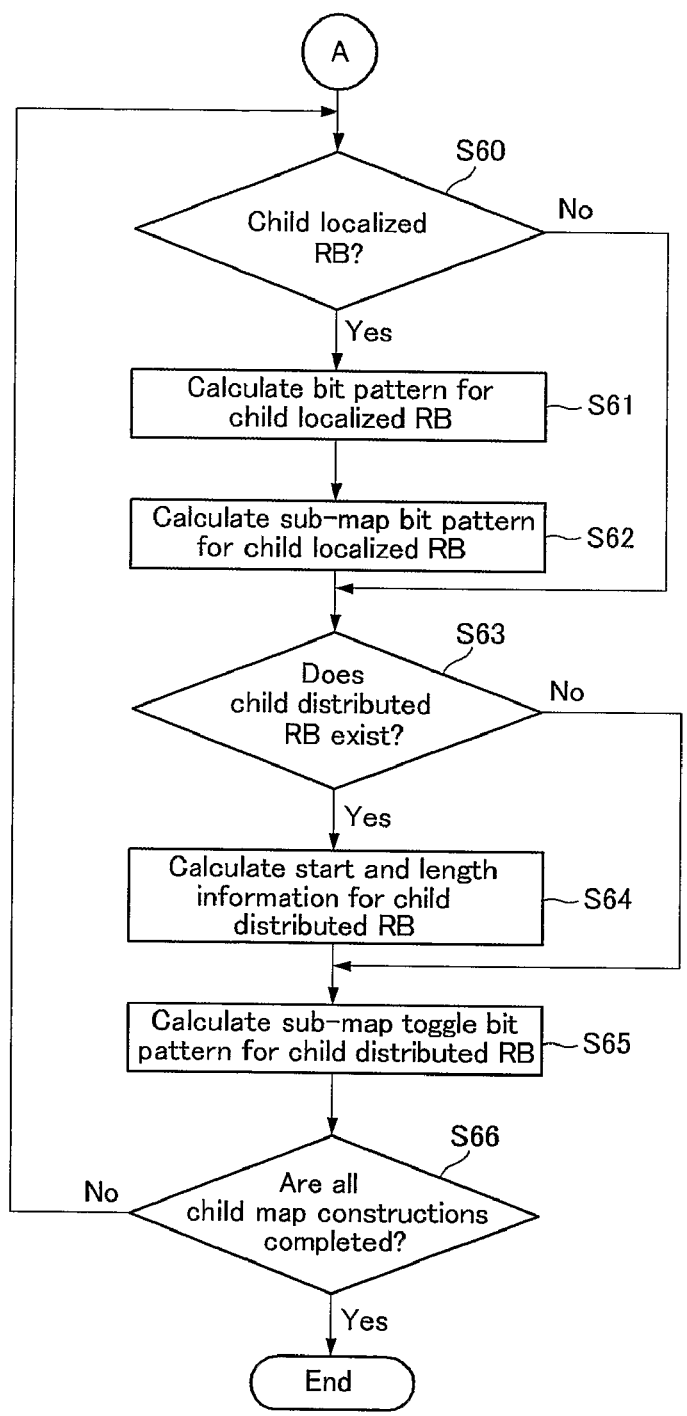
FIG. 25 is a flowchart illustrating a method of constructing a child map in a hierarchical pattern method and a start-length method in a case where a localized radio resource and a distributed radio resource according to a fifth exemplary embodiment of the present invention are mixed.

FIG. 25 is a flowchart illustrating a method of constructing a child map in a hierarchical pattern method and a start-length method in a case where a localized radio resource and a distributed radio resource according to a fifth exemplary embodiment of the present invention are mixed.

As shown in FIG. 25, the child map according to the fifth exemplary embodiment of the present invention shows a method of allocating a resource in which information for a child distributed RB (sub-map distributed resource block) allocated in the corresponding map is constructed in a start-length method, a child distributed RB allocated to each child RB is displayed in a toggle pattern method, and information for the other distributed RBs is not included.

The method of constructing the mother map is the same as that in the above-described fourth exemplary embodiment, and the method of constructing the child map is different from the above-described method in an allocation portion for the distributed RB. The description of the repetitive contents (Steps S60, S61, and S62) will be omitted.

According to the method of constructing resource allocation information for a distributed RB in each child map according to the fifth exemplary embodiment of the present invention, first, when a distributed RB allocated to each child map exists (Step S63), each child map represents a starting point and the length of the corresponding distributed RB in the start-length method (Step S64). After displaying the distributed RB region allocated to each child map by information for the starting point and the length of the RB displayed in the start-length method, each child map represents resource allocation information in a toggle pattern method for the distributed RB allocated to each child map (Step S66).

As compared with the fourth exemplary embodiment shown in FIG. 25, according to the fifth exemplary embodiment, the method of allocating the toggle bits to the distributed RB that is not allocated to each child map is changed to the method of allocating the toggled bit to the distributed RB that is allocated to each child map. Meanwhile, when the number of terminals allocated with the distributed RB in each child map is 1, one terminal uses all the child distributed RBs. Therefore, allocation information can be represented by the start-length code without an additional sub-map toggle bit pattern. This corresponds to the case of the child map 1 shown in FIG. 27 to be described below.

FIG. 26 is a diagram illustrating an example of a child map that is constructed in a hierarchical pattern method and a start-length method in a case where a localized radio resource and a distributed radio resource according to a fifth exemplary embodiment of the present invention are mixed.

As shown in FIG. 26, the child map according to the fifth exemplary embodiment includes information of a localized RB allocation and a distributed RB allocation for mobile terminals.

Meanwhile, in the case of the distributed RB allocation, in order to inform a range of the child distributed RB that is used in the child map among the distributed RBs, the start field and the length field are included, and an allocation RB for each terminal is informed by the sub-map toggle bit pattern in the range.

FIG. 27 shows an example of constructing a resource allocation map in a hierarchical pattern method and a start-length method in a case where a localized radio resource and a distributed radio resource according to a fifth exemplary embodiment of the present invention are mixed. The method shown in FIG. 27 is different from the method shown in FIG. 22 in the method of constructing resource allocation information for the radio resource and a structure of resource allocation information for the distributed RB. Therefore, the repetitive description will be omitted. Further, because a constructing of mother MAP is same with mother MAP of FIG. 22, FIG. 27 shows a constructing of child MAP Referring to the case where resource allocation information for a distributed RB is constructed in each child map, in the case of the child map 1, first to fourth distributed RBs are allocated to the child map 1, and the start becomes 1 and the length thereof becomes 4. Meanwhile, in the child map 1, one terminal is allocated with a distributed RB, and the allocation information is included in the start-length information. The additional toggle bits are not necessary.

Meanwhile, in the child map 2, the start becomes 5, the length thereof becomes 7, and the number of terminals allocated with the distributed RB is two. Therefore, the sub-map toggle bit pattern is additionally required because of the length.

Figure 28:
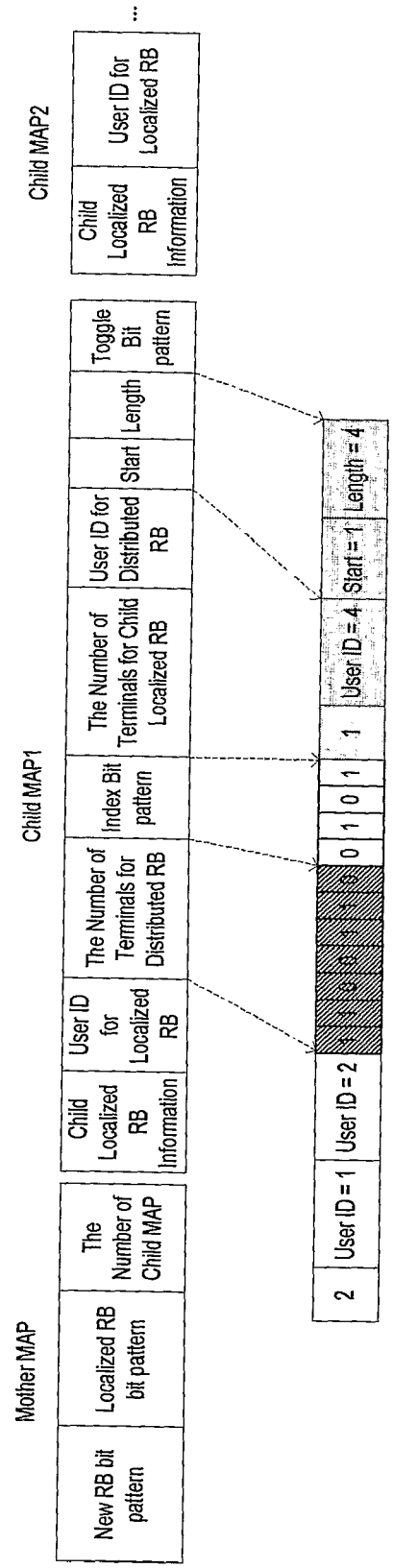
FIG. 28 is a diagram illustrating an example of a resource allocation map that is constructed in a hierarchical pattern method and a start-length method in a case where a localized radio resource and a distributed radio resource according to a fifth exemplary embodiment of the present invention are mixed.

FIG. 28 shows a portion of a resource allocation map that is constructed in the method shown in FIG. 27, which shows a mother map that includes a new RB bit pattern column and a localized RB bit pattern column and a child map that includes a sub-map index bit pattern for the child localized RB and the start, the length, and the sub-map toggle bit pattern for the distributed RB.

As described above, each child map separately manages information for a localized RB and a distributed RB allocated to each child map. According to the method of allocating the radio resource to each mobile terminal on the basis of the information, similar to the method according to the fourth exemplary embodiment of the present invention, each mobile terminal can receive a child map allocated to each mobile terminal regardless of receiving another child map and obtain resource allocation information. Even when an error occurs when receiving another sub-map (child map), each mobile terminal can accurately know the location of the radio resource that is allocated to each mobile terminal.

The method of constructing the map has been described without discriminating the downlink allocation and the uplink allocation. The technology of the present invention can be applied to the downlink and uplink allocations by the same method.

Further, in the exemplary embodiment of the present invention, after constructing the resource allocation information for the localized RB, the resource allocation information for the distributed RB is constructed. The order may be changed.

While this invention has been described in connection with what is presently considered to be practical exemplary embodiments, it is to be understood that present invention is not limited to the disclosed embodiments, but, on the contrary, is intended to cover various modifications and equivalent arrangements included within the spirit and scope of the appended claims.

According to the exemplary embodiments of the invention, in a method of constructing a resource allocation map in a hierarchical pattern method in a case where a localized resource block (localized RB) and a distributed resource block (distributed RB) need to be simultaneously allocated in regards to a radio resource allocated in a previous frame or reserved with a fixed allocation, it is possible to provide an efficiency map that can inform information for a radio resource allocated to each mobile terminal with smaller bits regardless of whether another map is received or not.

What is claimed is:

1. A method of constructing a resource allocation map in a case where a base station allocates a radio resource to a plurality of mobile terminals by using a localized resource block in a mobile communication system, the localized resource block being a localized sub-channel composed of neighboring sub-carriers, the method comprising:
   including, by the base station, a mobile terminal identifier column where identifiers of the mobile terminals are continuously displayed, in the resource allocation map;
   setting, by the base station, an index for each mobile terminal according to an order in which the mobile terminal identifiers are displayed, and allocating an index of a mobile terminal corresponding to each of resource blocks of the radio resource for each resource block, the resource block being a unit of a minimal radio resource found by dividing a radio resource used when data is transmitted;
   including, by the base station, an index bit pattern where indexes allocated for the individual resource blocks are arranged according to an order of the resource blocks included in the radio resource, in the resource allocation map, wherein the index for each mobile terminal and the index bit pattern are described in bit notation; and between the including of the mobile terminal identifier column in the resource allocation map, and the setting of an index for each mobile terminal and the allocating of an index of a mobile terminal for each resource block, determining, by the base station, the number of bits that form the index, wherein the number of bits that form the index is calculated, by the base station, by Equation $\{\log_2(M)\}$, where reference character M indicates the number of mobile terminals.

2. A method of constructing a resource allocation map in a case where a base station allocates a radio resource to a plurality of mobile terminals by using a localized resource block in a mobile communication system, the localized resource block being a localized sub-channel composed of neighboring sub-carriers, the method comprising:

including, by the base station, a mobile terminal identifier column where identifiers of the mobile terminals are continuously displayed, in the resource allocation map;

setting, by the base station, an index for each mobile terminal according to an order in which the mobile terminal identifiers are displayed, and allocating an index of a mobile terminal corresponding to each of resource blocks of the radio resource for each resource block, the resource block being a unit of a minimal radio resource found by dividing a radio resource used when data is transmitted;

including, by the base station, an index bit pattern where indexes allocated for the individual resource blocks are arranged according to an order of the resource blocks included in the radio resource, in the resource allocation map, wherein the index for each mobile terminal and the index bit pattern are described in bit notation;

between the setting of an index for each mobile terminal and the allocating of an index of a mobile terminal for each resource block, and including of the index bit pattern in the resource allocation map, allocating, by the base station, an index corresponding to a resource block of the radio resource that is not allocated to the mobile terminal; and between the including of the mobile terminal identifier column in the resource allocation map, and the setting of an index for each mobile terminal and the allocating of an index of a mobile terminal for each resource block, determining, by the base station, the number of bits that form the index, wherein the number of bits that form the index is calculated, by the base station, by Equation $\{\log_2(M+1)\}$, where reference character M indicates the number of mobile terminals.

3. A method of constructing a resource allocation map in a case where a base station allocates a radio resource to a plurality of mobile terminals by using a distributed resource block in a mobile communication system, the distributed resource block being a distributed sub-channel composed of distributed sub-carriers, the method comprising:

including, by the base station, a mobile terminal identifier column where identifiers of the mobile terminals are continuously displayed according to an order in which the radio resource is allocated to the mobile terminals, in the resource allocation map;

setting, by the base station, a toggle bit to each mobile terminal according to an order in which the mobile terminal identifiers are displayed, and allocating a toggle bit of a mobile terminal corresponding to a resource block of the radio resource for each resource block, the resource block being a unit of a minimal radio resource found by dividing a radio resource used when data is transmitted; and including, by the base station, a toggle bit pattern where the toggle bits allocated for the individual resource blocks are arranged according to the order of the resource blocks included in the radio resource, in the resource allocation map, wherein the index for each mobile terminal and the index bit pattern are described in bit notation, wherein, in the setting of the toggle bit to each mobile terminal and the allocating of the toggle bit of a mobile terminal for each resource block, different toggle bits are allocated, by the base station, to neighboring mobile terminals in the order in which the radio resource is allocated, wherein between the setting of the toggle bit to each mobile terminal and the allocating of the toggle bit of a mobile terminal for each resource block, and the including of the toggle bit pattern in the resource allocation map, allocating, by the base station, a toggle bit that corresponds to a resource block of the radio resource that is not allocated to the mobile terminals is further included, and wherein a toggle bit allocated to a resource block that is not allocated in the allocating of the toggle bit and a toggle bit of a resource block that is adjacent to the resource block not allocated and is allocated with the mobile terminal are different from each other.

* * * * *